US012725071B2

(12) United States Patent
Xu et al.

(10) Patent No.: US 12,725,071 B2
(45) Date of Patent: Sep. 1, 2026

(54) CALIBRATION METHOD AND APPARATUS FOR QUBIT GATE, ELECTRONIC DEVICE, AND MEDIUM

(71) Applicant: Tencent Technology (Shenzhen) Company Limited, Shenzhen (CN)

(72) Inventors: Xiong Xu, Shenzhen (CN); Zhenxing Zhang, Shenzhen (CN); Yicong Zheng, Shenzhen (CN); Tianyu Zhang, Shenzhen (CN); Shengyu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 92 days.

(21) Appl. No.: 18/784,710

(22) Filed: Jul. 25, 2024

(65) Prior Publication Data

US 2026/0065121 A1 Mar. 5, 2026

Related U.S. Application Data

(63) Continuation of application No. PCT/CN2023/138520, filed on Dec. 13, 2023.

(30) Foreign Application Priority Data

Sep. 6, 2023 (CN) ......................... 202311146948.3

(51) Int. Cl.
*G06N 10/00* (2022.01)
*G06F 11/00* (2006.01)
(Continued)

(52) U.S. Cl.
CPC ........... *G06N 10/70* (2022.01); *G06F 11/008* (2013.01); *G06N 10/00* (2019.01); *G06N 10/40* (2022.01); *G06F 2201/805* (2013.01)

(58) Field of Classification Search
CPC ........ G06N 10/70; G06N 10/40; G06N 10/00; G06F 11/008
See application file for complete search history.

(56) References Cited

U.S. PATENT DOCUMENTS 11,875,222 B1 * 1/2024 Reagor .................. G06N 10/20
12,039,465 B2 * 7/2024 Raymond .............. G01R 23/16
(Continued)

FOREIGN PATENT DOCUMENTS

WO WO 2022147168 A3 7/2022

OTHER PUBLICATIONS

Tencent Technology, ISR, PCT/CN2023/138520, Apr. 16, 2024, 2 pgs.

(Continued)

*Primary Examiner* — Jonathan D Gibson
(74) *Attorney, Agent, or Firm* — Morgan, Lewis & Bockius LLP

(57) ABSTRACT

The present disclosure provides a method for calibrating a qubit gate performed by an electronic device. The method includes: obtaining a first fidelity of a first qubit gate from qubit gates for processing a qubit; determining a first fidelity interval including the first fidelity from a plurality of preset fidelity intervals; determining a target second qubit gate from the qubit gates based on the first qubit gate and the first fidelity interval and based on a first mapping relationship between a plurality of prior-calibrated qubit gates and a corresponding fidelity interval and a plurality of preferred target qubit gates; determining a first calibration means from a plurality of first candidate calibration means based on the first qubit gate and the first fidelity interval and based on a second mapping relationship between the prior-calibrated qubit gates and calibration means; and calibrating the second qubit gate through the first calibration means.

14 Claims, 12 Drawing Sheets

(51) Int. Cl.

| | |
|---|---|
| ***G06N 10/40*** | (2022.01) |
| ***G06N 10/70*** | (2022.01) |

(56) References Cited

U.S. PATENT DOCUMENTS

| | | | | |
|---|---|---|---|---|
| 2009/0259905 | A1* | 10/2009 | Silva | B82Y 10/00 977/933 |
| 2017/0357561 | A1* | 12/2017 | Kelly | G06F 15/82 |
| 2018/0260732 | A1* | 9/2018 | Bloom | G06N 10/70 |
| 2020/0174879 | A1* | 6/2020 | Javadiabhari | G06F 11/0721 |
| 2020/0387822 | A1* | 12/2020 | Kilmov | G06F 15/82 |
| 2020/0394524 | A1* | 12/2020 | Vainsencher | G06N 10/60 |
| 2021/0081816 | A1* | 3/2021 | Klimov | G06N 20/00 |
| 2022/0206866 | A1* | 6/2022 | Maksymov | G06N 10/20 |
| 2023/0316117 | A1* | 10/2023 | Martinis | G06N 10/20 706/45 |
| 2024/0020569 | A1* | 1/2024 | Inoue | G06N 10/20 |
| 2024/0069079 | A1* | 2/2024 | Shi | G01R 23/02 |
| 2024/0160976 | A1* | 5/2024 | Klimov | G06N 10/20 |
| 2024/0177038 | A1* | 5/2024 | Niu | G06N 10/40 |
| 2024/0289289 | A1* | 8/2024 | Fang | G06F 13/36 |
| 2024/0346353 | A1* | 10/2024 | Kanazawa | G06N 10/40 |
| 2025/0117683 | A1* | 4/2025 | Seif | G06N 10/60 |
| 2025/0131300 | A1* | 4/2025 | Werner | G06N 10/20 |
| 2025/0328794 | A1* | 10/2025 | Ethier-Majcher | G06N 10/40 |

OTHER PUBLICATIONS

Tencent Technology, Extended European Search Report, EP Patent Application No. 23925592.0, Jul. 14, 2025, 8 pgs.

* cited by examiner

CALIBRATION METHOD AND APPARATUS FOR QUBIT GATE, ELECTRONIC DEVICE, AND MEDIUM

CROSS-REFERENCE TO RELATED APPLICATIONS

This application is a continuation application of PCT Patent Application No. PCT/CN2023/138520, entitled "CALIBRATION METHOD AND APPARATUS FOR QUBIT GATE, ELECTRONIC DEVICE, AND MEDIUM" filed on Dec. 13, 2023, which claims priority to Chinese Patent Application No. 202311146948.3, entitled "CALIBRATION METHOD AND APPARATUS FOR QUBIT GATE, ELECTRONIC DEVICE, AND MEDIUM" filed with the China National Intellectual Property Administration on Sep. 6, 2023, both of which are incorporated herein by reference in their entirety.

FIELD OF THE TECHNOLOGY

The present disclosure relates to the field of quantum computing, and in particular, to a calibration method and apparatus for a qubit gate, an electronic device, and a medium.

BACKGROUND OF THE DISCLOSURE

The essence of performing a computing task using a qubit is to perform a gate operation on the qubit. However, there is usually a deviation between a computing result obtained through the gate operation and an expected result. Therefore, a qubit gate needs to be calibrated before the computing task is performed, to improve accuracy of a quantum computing result. A proximity between the computing result actually obtained through the gate operation and the expected result is a fidelity of the qubit gate. The fidelity of the qubit gate can be increased through a calibration means.

In the related art, a plurality of qubit gates need to be adjusted based on a pre-specified calibration path, and a calibration process is fixed, causing low calibration efficiency of the fidelity of the qubit gate.

SUMMARY

Embodiments of the present disclosure provide a calibration method and apparatus for a qubit gate, an electronic device, and a medium, which can improve calibration efficiency of a fidelity of the qubit gate.

According to an aspect of the present disclosure, a calibration method for a qubit gate is provided, including:

- obtaining a first fidelity of a first qubit gate from a plurality of qubit gates for processing a qubit;
- determining a first fidelity interval including the first fidelity from a plurality of preset fidelity intervals;
- determining a target second qubit gate from the plurality of qubit gates based on a pre-stored first mapping relationship set based on the first qubit gate and the first fidelity interval, the first mapping relationship set including a first mapping relationship between a plurality of first elements and a plurality of second elements, the first element including a plurality of prior-calibrated qubit gates and a fidelity interval in which fidelities of the plurality of prior-calibrated qubit gates are located, and the second element including a preferred target qubit gate;
- determining a first calibration means from a plurality of first candidate calibration means based on the first qubit gate and the first fidelity interval and based on a pre-stored second mapping relationship set, the second mapping relationship set including a second mapping relationship between the plurality of the first elements and a plurality of third elements, and the third element including a plurality of calibration means; and
- calibrating the second qubit gate through the first calibration means.

According to an aspect of the present disclosure, an electronic device is provided, including a memory and a processor, the memory having a computer program stored therein, and the processor, when executing the computer program, implementing the calibration method for a qubit gate.

According to an aspect of the present disclosure, a non-transitory computer-readable storage medium is provided, having a computer program stored therein, the computer program, when executed by a processor, implementing the calibration method for a qubit gate.

According to an aspect of the present disclosure, a computer program product is provided, including a computer program, the computer program being read and executed by a processor of a computer device, to cause the computer device to perform the calibration method for a qubit gate.

In the embodiments of the present disclosure, an initial first qubit gate is determined from a plurality of qubit gates of a qubit. A first fidelity of the first qubit gate is obtained, and a next target second qubit gate and a first calibration means for calibrating the second qubit gate are determined based on the first fidelity. The second qubit gate is calibrated through the first calibration means. In this way, according to the calibration method for a qubit gate provided in the embodiments of the present disclosure, a to-be-calibrated next qubit gate and a corresponding calibration means can be dynamically determined based on a fidelity of a current qubit gate. Therefore, limitations of fixed order calibration on the to-be-calibrated qubit gate and a calibration effect in the related art are avoided, the fidelity of the qubit gate can be calibrated flexibly, and calibration efficiency of the fidelity of the qubit gate can be increased.

Other features and advantages of the present disclosure are described in the following specification, and partially become apparent from the specification, or can be learned through implementation of the present disclosure. Objectives and other advantages of the present disclosure can be implemented and obtained by using structures particularly pointed out in the specification, claims, and accompanying drawings.

BRIEF DESCRIPTION OF THE DRAWINGS

The accompanying drawings are used to provide a further understanding of the technical solutions of the present disclosure, and constitute a part of the specification, which are used to explain the technical solutions of the present disclosure in combination with embodiments of the present disclosure, and do not constitute a limitation to the technical solutions of the present disclosure.

DESCRIPTION OF EMBODIMENTS

Figure 1:
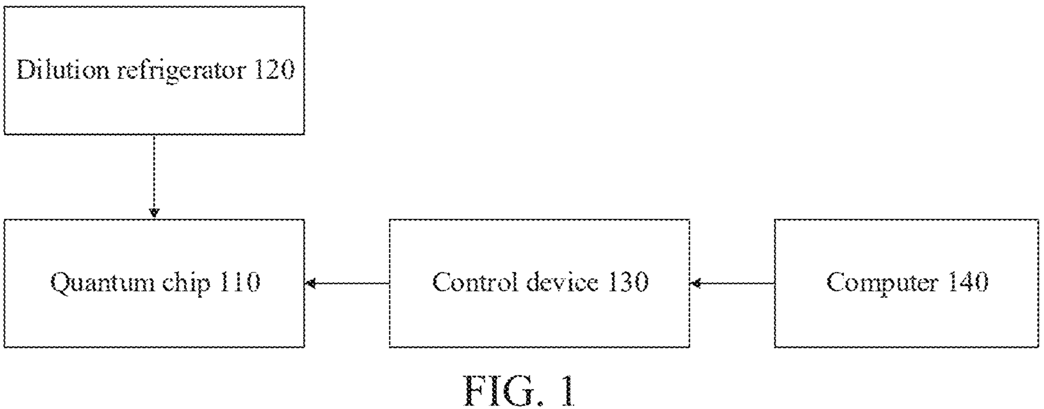
FIG. 1 is an architectural diagram of a system to which a calibration method for a qubit gate according to the embodiments of the present disclosure is applied.

To make the objectives, technical solutions and advantages of the present disclosure more apparent and clearer, the following describes the present disclosure in further detail with reference to the accompanying drawings and embodiments. The specific embodiments described therein are merely used to explain the present disclosure instead of limiting the present disclosure.

Before the embodiments of the present disclosure are further described in detail, terms involved in the embodiments of the present disclosure are described, and the terms involved in the embodiments of the present disclosure are explained as follows:

Quantum computing: The quantum computing is a computing method designed by using the principle of quantum mechanics. The largest difference between the quantum computing and conventional computing is that quantum computing uses qubits instead of conventional binary bits for computing. The qubits have different characteristics from the conventional binary bits, and the most important characteristic is that the qubits may be in multiple states at the same time. The famous theory "Schrödinger's cat" is used as an example. A cat is locked in a sealed container with a tiny bit of radium and cyanide. There is a probability of radium decay. If the radium decays, it triggers a mechanism to break the bottle containing the cyanide, and the cat dies. If the radium does not decay, the cat survives. According to the theory of quantum mechanics, because the radioactive radium is in a superposition state of decay and non-decay, the cat is supposed to be in a superposition state of the dead cat and the living cat. The dead and living cat is the so-called "Schrödinger's cat". However, since there is no dead and alive cat, a result can be known only after the container is opened. However, because the qubits can represent two states at the same time and carry more information, more data operations can be completed by using the same quantity of qubits than classical computing. Therefore, quantum computing greatly improves a computer processing speed.

Quantum: The quantum in "quantum computing" is the smallest discrete unit used by a system to calculate outputs.

Qubit: The qubit is a basic information unit in the quantum computing. A role played by the qubit in the quantum computing is similar to a role played by the bit in the conventional computing, but their behaviors are greatly different. The classical bit is binary, and can store only a 0 or 1, but the qubit can store a superposition of all possible states, that is, a superposition state of a state $|0\rangle$ and a state $|1\rangle$. Therefore, the computer processing speed is greatly improved. A single qubit may also be referred to as a qubit unit.

Entanglement: The entanglement is a capability of the qubits to relate to each other. When the qubits are entangled with each other, the qubits form a system, and affect each other. A quantum computer can calculate exponential information, and resolve more complex problems by adding and entangling more qubits in the quantum computing.

Fidelity of a qubit gate: Each qubit may use a plurality of different qubit gate operations. When the qubit unit performs a quantum computing task, the qubit gate operation is generally expected to reach an expected result. The expected result is a theoretical gate operation result, and the expected result may also be referred to as an expected gate operation result. However, the qubit gate is affected by an external environment. Due to various reasons, there is a generally deviation between an actual gate operation result (that is, an observation result obtained by observing a state of the qubit after the gate operation) and the expected gate operation result. A proximity between the actual gate operation result and the expected gate operation result is the fidelity of the qubit gate. A higher fidelity of the qubit gate indicates greater accuracy of the qubit gate performing a task.

Architecture and Scenario Description of a System to which the Embodiments of the Present Disclosure are Applied FIG. 1 is an architectural diagram of a system to which a calibration method for a qubit gate according to the embodiments of the present disclosure is applied. The system includes a quantum chip 110, a dilution refrigerator 120, a control device 130, a computer 140, and the like.

The quantum chip 110 is a circuit acting on a physical qubit, and is configured to control the qubit to perform a quantum computing task, and configured to apply different calibration means to a qubit gate when a fidelity of the qubit gate is calibrated. A large quantity of qubit units are distributed in the quantum chip 110.

The dilution refrigerator 120 is configured to provide an extremely low temperature environment for the quantum chip 110, so that thermal noise is suppressed in the quantum chip 110, and quantum chip performance is improved.

The control device 130 is configured to control the quantum chip 110 to perform the quantum computing task. The control device 130 may be an electronic control system, a microwave control system, or the like. The computer 140 is configured to initiate a control instruction to the control device 130. For example, a written quantum program is compiled by the computer 140, to generate an instruction and send the instruction to the control device 130. Then, the control device 130 converts the instruction into an electronic control signal or a microwave control signal, and transmits the electronic control signal or the microwave control signal to the quantum chip 110. The quantum chip 110 controls the qubit. The computer 140 may be one of a classical computer or a quantum computer, or may be a mixed execution environment of a classical computer and a quantum computer.

The embodiments of the present disclosure may be applied to various scenarios, such as a scenario in which a plurality of quantum computing tasks are queued for execution.

After receiving the quantum computing task, the computer 140 needs to determine a qubit that may perform the task in a large quantity of qubits in the quantum chip 110. Therefore, for different quantum computing tasks, the qubits used in the quantum chip 110 may be different. Therefore, before the computer 140 performs each quantum computing task, fidelities of a plurality of qubit gates corresponding to the corresponding qubit may be calibrated, to improve accuracy of an execution result of the quantum computing task. If the computer 140 receives the plurality of quantum computing tasks, the fidelities of the plurality of qubit gates corresponding to the qubit used by each quantum computing task may be sequentially calibrated. If the fidelity of the qubit gate of one quantum computing task is calibrated for a long time, execution of another quantum computing task is also delayed. This certainly brings a challenge to calibration efficiency of the fidelity of the qubit gate.

Figure 2A:
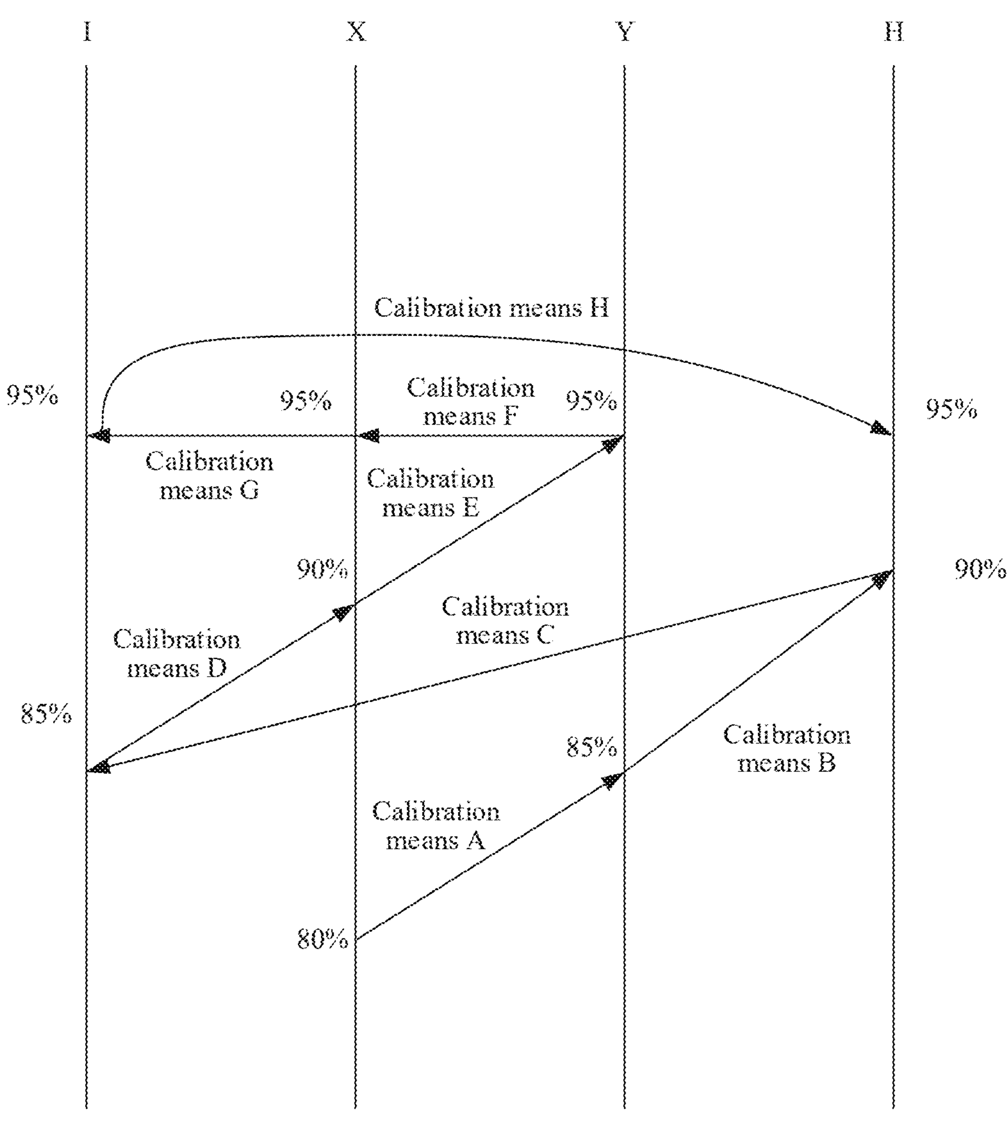
FIG. 2A is a schematic diagram of calibrating a plurality of qubit gates through a fixed calibration path.
Figure 2B:
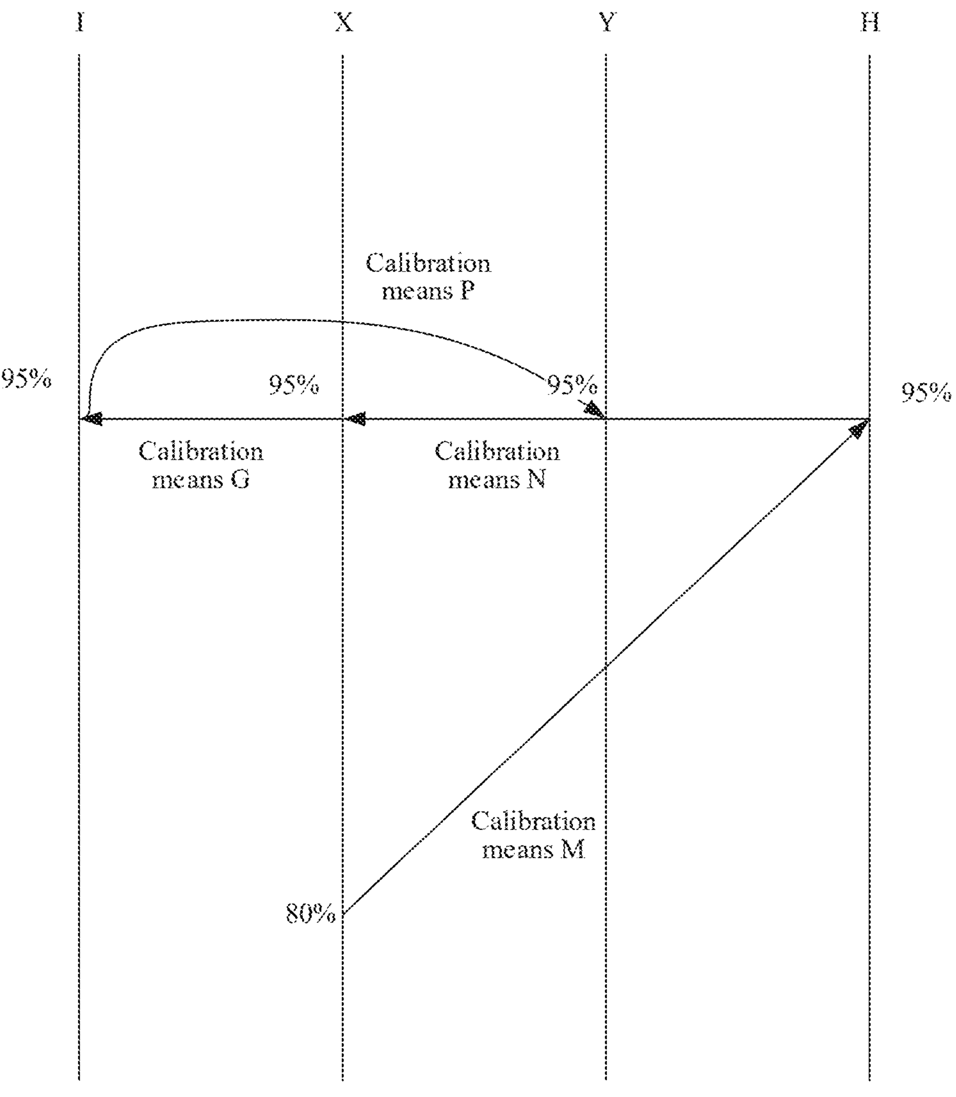
FIG. 2B is a schematic diagram of a calibration path for calibrating a plurality of qubit gates according to a calibration method for a qubit gate according to an embodiment of the present disclosure.

In the related art, for one quantum computing task, a process of calibrating the fidelity of the plurality of qubit gates corresponding to the qubit used by the quantum computing task is preset. Specifically, a directed acyclic graph (DAG) may be used to represent a preset process of calibrating the fidelity of the qubit gate. A node in the DAG represents one qubit gate and a correspondingly set fidelity calibration target. An edge in the DAG represents a dependency relationship between the nodes, that is, when fidelity calibration of the qubit gate in a previous node reaches the correspondingly set fidelity calibration target, it may enter a next node for fidelity calibration of the qubit gate of the next node. For example, as shown in FIG. 2A, there may be four to-be-calibrated qubit gates, that is, a gate I, a gate X, a gate Y, and a gate H respectively. When a fidelity of the gate X reaches 80%, based on a pre-determined path, a fidelity of the gate Y is calibrated through a calibration means A, so that the fidelity of the gate Y reaches 85%. After the fidelity of the gate Y reaches 85%, a fidelity of the gate H is calibrated through a calibration means B, so that the fidelity of the gate H reaches 90%. After the fidelity of the gate H reaches 90%, a fidelity of the gate I is calibrated through a calibration means C, so that the fidelity of the gate I reaches 85%. Similarly, then in sequence, the fidelity of the gate X is increased to 90% through a calibration means D, the fidelity of the gate Y is increased to 95% through a calibration means E, the fidelity of the gate X is increased to 95% through a calibration means F, the fidelity of the gate I is increased to 95% through a calibration means G, and the fidelity of the gate H is increased to 95% through a calibration means H. Calibration using such fixed calibration path and calibration means cannot enable exploration of other paths with better calibration results in the calibration process. For example, as shown in FIG. 2B, after the fidelity of the gate X reaches 80%, the fidelity of the gate H may be directly calibrated to 95% through a calibration means M; when the fidelity of the gate H reaches 95%, the fidelity of the gate X may be calibrated to 95% through a calibration means N; when the fidelity of the gate X reaches 95%, the fidelity of the gate I may be calibrated to 95% through a calibration means G; and when the fidelity of the gate I reaches 95%, the fidelity of the gate Y may be calibrated to 95% through a calibration means P. Eight calibrations need to be performed in total in the calibration path shown in FIG. 2A, but only four calibrations need to be performed in the calibration path shown in FIG. 2B. It is clear that calibration efficiency of the calibration path in FIG. 2B is higher. However, such calibration path with the better calibration effect is not considered in the solutions in the related art, causing low calibration efficiency. In a scenario in which a plurality of quantum computing tasks are queued for execution, rapid calibration cannot be performed on each quantum computing task, affecting execution efficiency of the quantum computing task. In addition, in the method for calibrating the fidelity of the qubit gate based on the DAG in the related art, there may also be a situation in which the fidelity of the qubit gate in a current node cannot be calibrated to a fidelity target set in the node. In this case, because a task of the current node is not completed, a corresponding calibration task also cannot be performed at a next node that depends on the node, causing a stuck calibration process, and greatly reducing the calibration efficiency of the fidelity of the qubit gate.

In the embodiments of the present disclosure, a next to-be-calibrated qubit gate and a next to-be-used calibration means may be determined based on a fidelity of a current qubit gate. Referring to the qubit gate in FIG. 2A and FIG. 2B, if the current qubit gate is the gate X, and the fidelity is 80%, a gate that brings the best calibration effect is determined from the gate I, the gate Y, and the gate H as the next to-be-calibrated qubit gate, and a calibration means that can maximize the fidelity of the next to-be-calibrated qubit gate is determined from a plurality of calibration means. Based on the fixed path in FIG. 2A, when the fidelity of the gate X reaches 80%, the gate Y needs to be calibrated through the calibration means A, so that the fidelity of the gate Y reaches 85%. However, according to the embodiments of the present disclosure, when the fidelity of the gate X reaches 80%, the calibration effect of the gate H is better, and the fidelity of the gate H can be directly increased to 95% through the calibration means M. Therefore, in the embodiments of the present disclosure, the calibration efficiency of the fidelity of the qubit gate is greatly improved, and in a scenario in which a plurality of quantum computing tasks are queued for execution, the execution progress of the plurality of quantum computing tasks is accelerated by reducing the calibration time required for each quantum computing task.

General Description of the Embodiments of the Present Disclosure

A calibration method for a qubit gate is provided according to an embodiment of the present disclosure.

The qubit gate controls a state of the qubit by applying a radio frequency modulation signal to the qubit, to implement a gate operation. The state of the qubit is a superposition state of a state |0> and a state |1>, a probability corresponding to the state |0> is $\alpha$, and a probability corresponding to the state |1> is $\beta$. Values of $\alpha$ and $\beta$ change when the superposition state of the qubit is changed by applying different radio frequency modulation signals. However, regardless of the change, the values satisfy $\alpha^2+\beta^2=1$. Performing a quantum computing task by using the qubit is essentially performing a large quantity of gate operations on the qubit based on the quantum computing task. There are various qubit gates, such as a qubit gate I, a qubit gate X, a qubit gate Y, and a qubit gate H. Radio frequency modulation signals applied by different qubit gates are different, and the state of the qubit after the gate operation is also different. For example, the gate X interchanges the probability of the state |0> and the state |1> of the qubit, that is, the probability corresponding to the state |0> changes to β, and the probability corresponding to the state |1> changes to α. The gate H changes the probability corresponding to the state |0> of the qubit to $$\frac{1}{\sqrt{2}}\alpha+\frac{1}{\sqrt{2}}\beta,$$

and changes the probability corresponding to the state $$|1>\text{ to }\frac{1}{\sqrt{2}}\alpha+\frac{1}{\sqrt{2}}\beta.$$

The superposition state of the qubit is an expected state after the gate operation. However, in reality, a state obtained after the gate operation is performed on the qubit usually cannot reach the expected state. Therefore, the fidelity is used to measure a difference between an actual state and the expected state after the gate operation of one qubit gate is performed on the qubit. A higher fidelity indicates a smaller difference. A calibration process of the qubit gate is a process of increasing the fidelity of the qubit gate.

When the fidelity of the plurality of qubit gates is calibrated, a calibration order and an applied calibration means need to be considered. In the related art, the calibration order of the plurality of qubit gates and the applied calibration means are fixed, and an increased amount of the fidelity after each calibration is also fixed. This prevents the exploration of calibration paths with better calibration effects and corresponding calibration means in the calibration process, and reduces the calibration efficiency.

A calibration method for a qubit gate is provided according to an embodiment of the present disclosure.

The calibration method for a qubit gate in the embodiments of the present disclosure may be performed on a server, or may be performed on a terminal.

Figure 3:
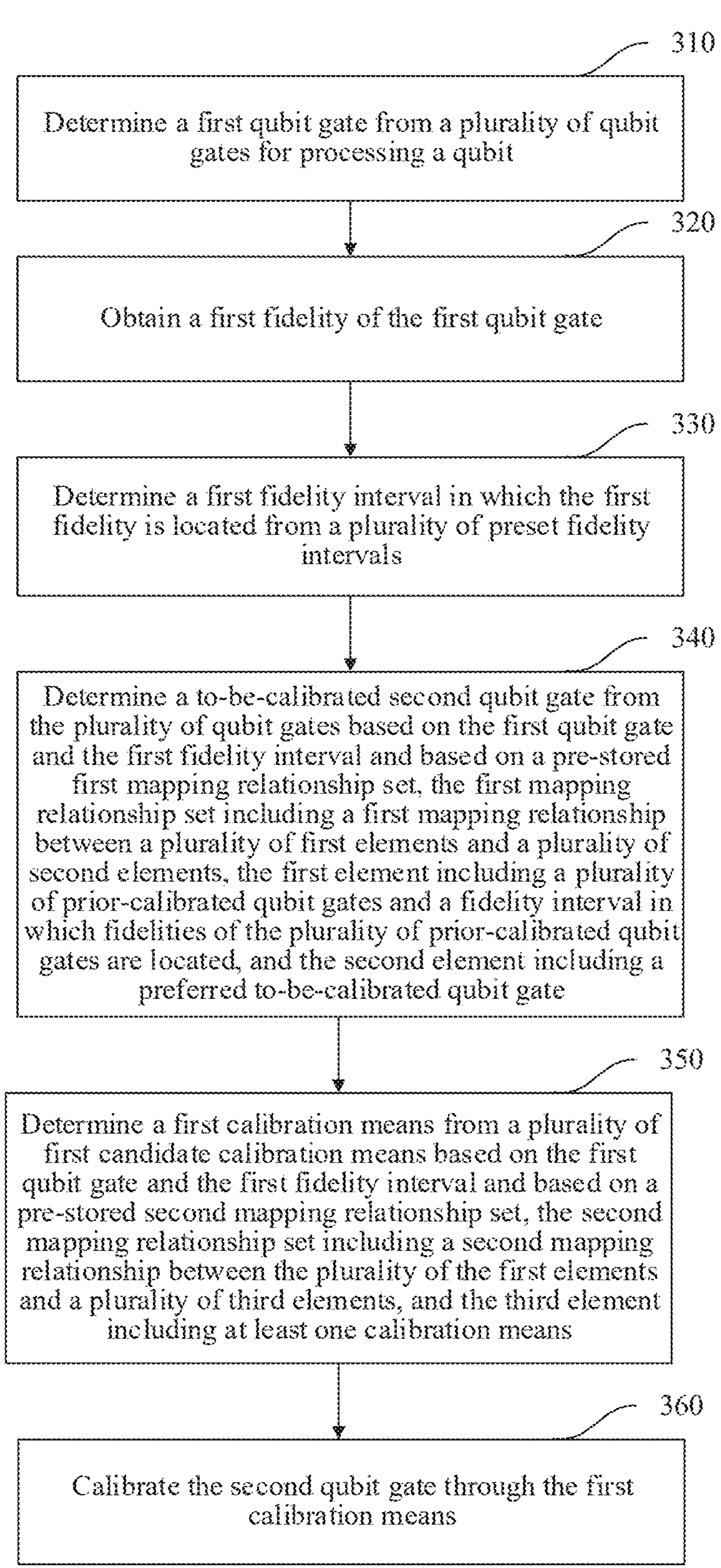
FIG. 3 is an overall flowchart of a calibration method for a qubit gate according to an embodiment of the present disclosure.

As shown in FIG. 3, a calibration method 300 for a qubit gate in the embodiments of the present disclosure includes the following operations.

Operation 310: Determine a first qubit gate from a plurality of qubit gates for processing a qubit.

Operation 320: Obtain a first fidelity of the first qubit gate.

Operation 330: Determine a first fidelity interval including the first fidelity from a plurality of preset fidelity intervals.

Operation 340: Determine a target second qubit gate from the plurality of qubit gates based on the first qubit gate and the first fidelity interval and based on a pre-stored first mapping relationship set, the first mapping relationship set including a first mapping relationship between a plurality of first elements and a plurality of second elements, the first element including a plurality of prior-calibrated qubit gates and a fidelity interval in which fidelities of the plurality of prior-calibrated qubit gates are located, and the second element including a preferred target qubit gate.

Operation 350: Determine a first calibration means from a plurality of first candidate calibration means based on the first qubit gate and the first fidelity interval and based on a pre-stored second mapping relationship set, the second mapping relationship set including a second mapping relationship between the plurality of the first elements and a plurality of third elements, and the third element including at least one calibration means.

Operation 360: Calibrate the second qubit gate through the first calibration means.

Operation 310 to operation 360 are described in detail below.

Detailed Description of Operation 310

Figure 4:
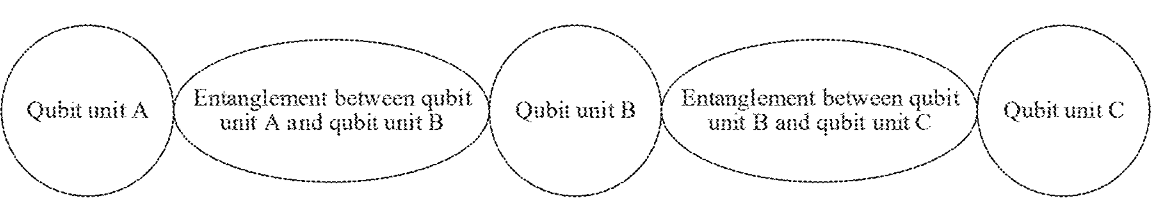
FIG. 4 is a schematic diagram of entanglement between a qubit unit and an adjacent qubit unit.

For one quantum computing task, a qubit unit that can perform the quantum computing task needs to be selected from a large quantity of qubit units in a quantum chip 110. The plurality of qubit units form a qubit network by associating two adjacent qubits. The two associated qubit units are entangled, and affect each other. During quantum computing, operations need to be performed by using each qubit unit in the qubit network, and operations need to be performed by using entanglement between the two associated qubit units. As shown in FIG. 4, a qubit unit A entangles with a qubit unit B, and the qubit unit B entangles with a qubit unit C. During quantum computing, the gate operation needs to be performed on the qubit unit A, the qubit unit B, the qubit unit C, entanglement between the qubit unit A and the qubit unit B, and entanglement between the qubit unit B and the qubit unit C through a plurality of qubit gates respectively. Therefore, fidelity calibration of the gate operation needs to be performed on each qubit unit and entanglement between the qubit units. Therefore, the qubit in the embodiments of the present disclosure may be the qubit unit or the entanglement between the qubit units.

A plurality of qubit gates corresponding to the qubit are a plurality of qubit gate operations performed based on the qubit. Difference between the qubit unit and the entanglement between the qubit units is that the qubit gates to which the qubit unit and the entanglement between the qubit units are applicable are different. If the qubit is the qubit unit, and the gate I, the gate X, the gate Y, and the gate H described above may perform the gate operation on the qubit, the four gates are to-be-calibrated qubit gates for the qubit. If the qubit gate is the entanglement between the qubit units, states of the two qubit units need to be considered in the gate operation. Assuming that there are two adjacent qubit units: A and B, a probability corresponding to a state |0> of A is $\alpha_A$, a probability corresponding to a state |1> is $\beta_A$, a probability corresponding to a state |0> of B is $\alpha_B$, and a probability corresponding to a state |0> is $\beta_B$. Assuming that there are two gate operations: a gate M and a gate N. The gate M converts $\alpha_A\alpha_B$ to $\alpha_A\beta_B$, converts $\alpha_A\beta_B$ to $\beta_A\alpha_B$, converts $\beta_A\alpha_B$ to $\beta_A\beta_B$, and converts $\beta_A\beta_B$ to $\alpha_A\alpha_B$. The gate N converts $\alpha_A\alpha_B$ to $(\alpha_A\alpha_B+\alpha_A\beta_B+\beta_A\alpha_B+\beta_A\beta_B)/4$, converts $\alpha_A\beta_B$ to $(\alpha_A\alpha_B+\alpha_A\beta_B+\beta_A\alpha_B+\beta_A\beta_B)/4$, converts $\beta_A\alpha_B$ to $(\alpha_A\alpha_B+\alpha_A\beta_B+\beta_A\alpha_B+\beta_A\beta_B)/4$, and converts BABB to $(\alpha_A\alpha_B+\alpha_A\beta_B+\beta_A\alpha_B+\beta_A\beta_B)/4$.

A first qubit gate may be an initial qubit gate determined from the plurality of qubit gates. Because the plurality of qubit gates of the qubit all need to be calibrated, any qubit gate may be used as the first qubit gate. Therefore, the first qubit gate may be determined from the plurality of qubit gates of the qubit in a random drawing manner.

Figure 5:
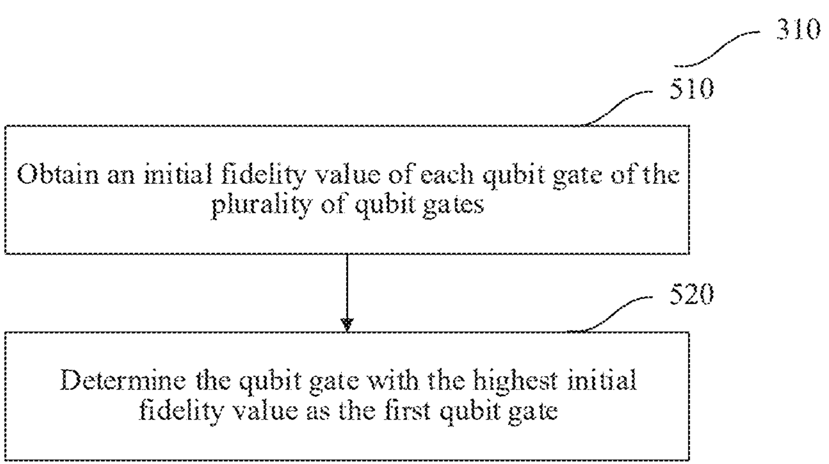
FIG. 5 is a specific flowchart of operation 310 in FIG. 3.

In another embodiment, as shown in FIG. 5, operation 310 of determining a first qubit gate from a plurality of qubit gates includes the following operations.

Operation 510: Obtain an initial fidelity value of each qubit gate of the plurality of qubit gates.

Operation 520: Determine the qubit gate with the highest initial fidelity value as the first qubit gate.

In this embodiment, the first qubit gate is determined based on the initial fidelity values of the plurality of qubit gates. The initial fidelity value is a fidelity value before the qubit gate is calibrated. The fidelity of the qubit gate is mainly affected by noise interference of an external environment. Therefore, if the external environment is stable, a fidelity value of an uncalibrated qubit gate does not greatly fluctuate. Therefore, the initial fidelity value of the qubit gate may be experimentally determined in advance in a stable environment, to be invoked at any time when needed. For example, through experiments, an initial fidelity value of the gate X is generally stable at 80%, with a slight fluctuation of 1%, and an initial fidelity value of the gate Y is generally stable at 85%, with a slight fluctuation of 1%. Then, 80% may be used as the initial fidelity value of the gate X, and 85% may be used as the initial fidelity value of the gate Y. In this way, efficiency of obtaining an initial fidelity value of each qubit gate can be improved.

Because a calibration process of the fidelity of the qubit gate is a process of spiraling up the fidelities of the plurality of qubit gates, the qubit gate with the highest initial fidelity value is used as the first qubit gate, so that a high base line can be set for the calibration process of the fidelity of the qubit gate. Therefore, calibration efficiency of the fidelity of the qubit gate is improved. Therefore, in the embodiments of the present disclosure, after the initial fidelity value of each qubit gate is obtained, the qubit gate with the highest initial fidelity value may be set as the first qubit gate, to set a high base line for the calibration process of the fidelity of the qubit gate, to further improve the calibration efficiency of the fidelity of the qubit gate.

Detailed Description of Operation 320

In operation 320, the first fidelity of the first qubit gate is obtained.

In the embodiments of operation 510 and operation 520, the initial fidelity value of the qubit gate may be experimentally determined in advance in the stable environment. If the first fidelity of the first qubit gate is obtained based on the embodiments of operation 510 and operation 520, an initial fidelity value corresponding to the first qubit gate may be used as the first fidelity directly when the first qubit gate is determined. If the first qubit gate is obtained in the random drawing manner, a pre-stored initial fidelity value of the first qubit gate may also be retrieved as the first fidelity. An advantage of using the initial fidelity of the first qubit gate as the first fidelity is that the first fidelity may be obtained faster and more efficiently.

Figure 6:
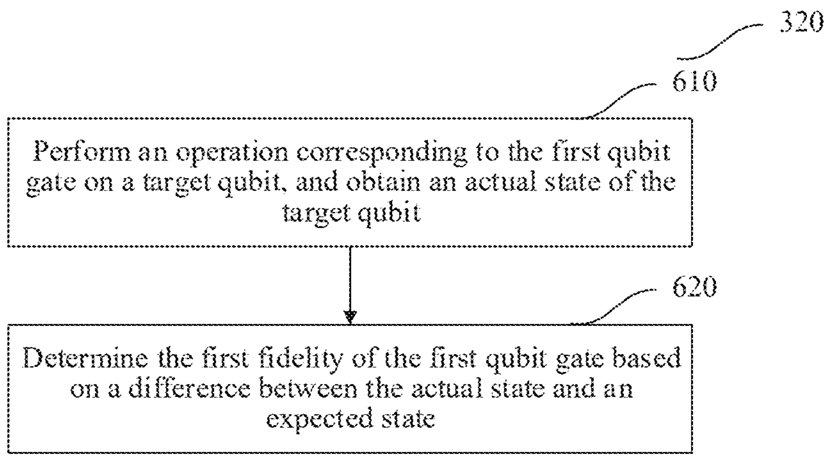
FIG. 6 is a specific flowchart of operation 320 in FIG. 3.

However, in subsequent operations, a second qubit gate and a first calibration means need to be determined based on the first fidelity. Therefore, accuracy of the first fidelity is important. Therefore, in another embodiment, as shown in FIG. 6, operation 320 includes the following operations.

Operation 610: Perform an operation corresponding to the first qubit gate on the qubit, and obtain an actual state of the qubit.

Operation 620: Determine the first fidelity of the first qubit gate based on a difference between the actual state of the qubit and an expected state of the qubit.

The first fidelity represents a difference between the actual state and the expected state of the qubit after the operation corresponding to the first qubit gate is performed on the qubit. The expected state is a state of the qubit after the operation corresponding to the first qubit gate is performed on the qubit in an ideal environment without any noise and interference. For example, if the first qubit gate is the gate X, after the gate X is performed on the qubit, probabilities of a state |0> and a state |1> are interchanged, to generate a new superposition state. In other words, if the probability of the state |0> of the qubit is 4/5, and the probability of the state |1> of the qubit is 3/5, after the operation corresponding to the gate X is performed on the qubit, the probability that the expected state of the qubit is the state |0> is 3/5, and the probability that the expected state of the qubit is the state |1> is 4/5. However, due to interference in an actual computing environment, the expected state usually cannot be reached after the first qubit gate is performed. For example, after the gate X is performed, the probability that the actual state of the qubit is the state |0> is 3/4, and the probability that the actual state of the qubit is the state |1> is $\sqrt{7}/4$. Therefore, there is a difference between the actual state of the qubit and the expected state of the qubit.

The first fidelity of the first qubit gate is determined based on the difference between the actual state of the qubit and the expected state of the qubit, as shown in Formula 1:

$$F(\varepsilon, \mu) = Tr\left[\varepsilon(|0><1)\mu(|0><1)\right] \quad \text{Formula (1)}$$

In Formula 1, ε is the actual state of the qubit after the gate operation of the first qubit gate; μ is the expected state; F is the difference between the actual state and the expected state, that is, the fidelity; and Tr is to perform a trace operation on the actual state and the expected state, to obtain the first fidelity of the first qubit gate.

In this embodiment, the actual state is obtained by performing the operation corresponding to the first qubit gate on the qubit, and then the first fidelity is determined based on the difference between the actual state and the expected state, to ensure that the first fidelity may reflect precision of the gate operation performed by the current first qubit gate, so that accuracy of obtaining the first fidelity is improved.

Detailed Description of Operation 330

In operation 330, a first fidelity interval including the first fidelity is determined from a plurality of preset fidelity intervals.

Different fidelity intervals correspond to the target second qubit gate, and also correspond to the first calibration means. Therefore, the first fidelity interval including the first fidelity needs to be determined.

In this embodiment, the fidelity may be divided based on the interval. For example, the first fidelity interval may be divided by 5% as a step size, including [0, 5%), [5%, 10%), . . . , [90%, 95%), and [95%, 100%). If the first fidelity is 81%, the first fidelity interval is [80%, 85%).

The step size of the fidelity interval is not limited in this application. A person skilled in the art may select an appropriate step size based on precision of qubit calibration. For example, if the precision is high, the step size may be small, and if the precision is low, the step size may be properly increased.

Detailed Description of Operation 340

In operation 340, a target second qubit gate is determined from the plurality of qubit gates based on the first qubit gate and the first fidelity interval and based on a pre-stored first mapping relationship set, the first mapping relationship set including a first mapping relationship between a plurality of first elements and a plurality of second elements, the first element including a plurality of prior-calibrated qubit gates and a fidelity interval in which fidelities of the plurality of prior-calibrated qubit gates are located, and the second element including a preferred target qubit gate.

Specifically, the pre-stored first mapping relationship set includes the first mapping relationship between the plurality of first elements and the plurality of second elements, the first elements include the plurality of prior-calibrated qubit gates and fidelity intervals in which the fidelities of the plurality of prior-calibrated qubit gates are located, and the second elements include the preferred target qubit gate. After the first qubit gate and the first fidelity interval in which the first qubit gate is located are determined, the first mapping relationship set is looked up based on the first qubit gate and the first fidelity interval, to obtain a target second qubit gate corresponding to the first qubit gate and the first fidelity interval.

The first mapping relationship set is determined in advance, so that the first mapping relationship set may be looked up directly based on the first element, to obtain the second element corresponding to the first element. In other words, a lookup is performed in the first mapping relationship set based on the first qubit gate and the first fidelity interval, to obtain the target second qubit gate corresponding to the first qubit gate and the first fidelity interval.

The first mapping relationship set may be stored in a plurality of forms such as a mapping relationship table and text.

Figure 7:
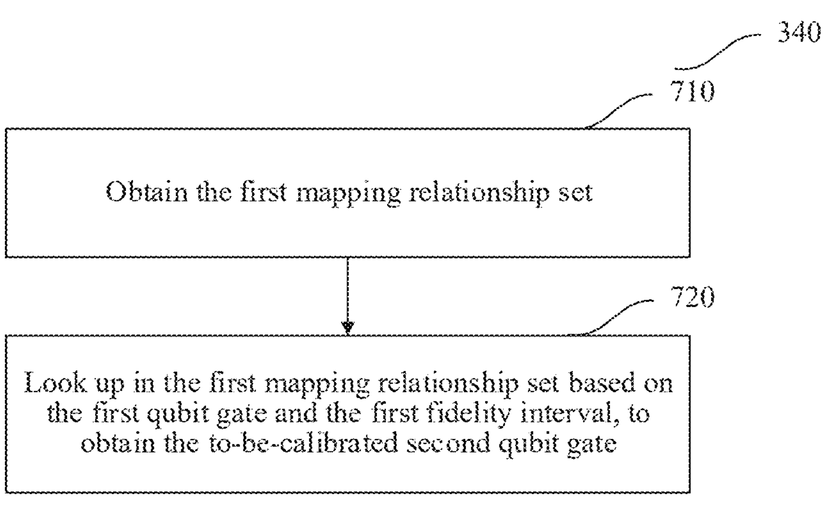
FIG. 7 is a specific flowchart of operation 340 in FIG. 3.

In an embodiment, as shown in FIG. 7, operation 340 includes the following operations.

Operation 710: Obtain the first mapping relationship set.

Operation 720: Look up in the first mapping relationship set based on the first qubit gate and the first fidelity interval, to obtain the target second qubit gate.

A storage location of the first mapping relationship set is not limited in this application. The first mapping relationship set may be stored in a local device, such as a terminal device that performs the method 300, or the first mapping relationship set may be stored in a cloud device, or may be stored in another device. Obtaining the first mapping relationship set includes obtaining the locally stored first mapping relationship set, or the first mapping relationship set stored by the cloud device.

In this embodiment, the first mapping relationship set is stored in a form of a mapping relationship table. A first mapping relationship table includes a first mapping relationship between a plurality of first elements and a plurality of second elements. The first element includes a plurality of prior-calibrated qubit gates and a fidelity interval in which fidelities of the plurality of prior-calibrated qubit gates are located. The second element includes a preferred target qubit gate. Table 1 shows an example of the first mapping relationship table.

TABLE 1

| First mapping relationship table | |
|---|---|
| First element: qubit gate and fidelity interval | Second element: to-be-calibrated qubit gate |
| Gate X [80%, 85%) | Gate Y |
| Gate Y [80%, 85%) | Gate H |
| Gate H [80%, 85%) | Gate I |
| Gate I [80%, 85%) | Gate X |
| Gate X [85%, 90%) | Gate H |
| Gate Y [85%, 90%) | Gate X |
| . . . | . . . |
| Gate H [95%, 100%) | Gate Y |
| Gate I [95%, 100%) | Gate H |

Based on the first mapping relationship table in Table 1, when the first qubit gate is the gate X, and the first fidelity interval is [80%, 85%), the to-be-calibrated qubit gate is the gate Y.

Through the first mapping relationship table, it may be unnecessary to traverse all qubit gates each time the to-be-calibrated qubit gate is determined, so that efficiency of determining the second qubit gate based on the first fidelity interval of the first qubit gate is improved.

The first qubit gate is a qubit gate calibrated before the second qubit gate, and after the first qubit gate is calibrated, no other qubit gates of the plurality of qubit gates are calibrated. A process of generating the first mapping relationship table is to determine a to-be-calibrated qubit gate with a best calibration effect based on a combination of the qubit gate and the fidelity interval, to generate a first mapping relationship.

Detailed Description of Operation 350

In operation 350, a first calibration means is determined from a plurality of first candidate calibration means based on the first qubit gate and the first fidelity interval and based on a pre-stored second mapping relationship set, the second mapping relationship set including a second mapping relationship between the plurality of the first elements and a plurality of third elements, and the third element including at least one calibration means.

Specifically, the pre-stored second mapping relationship set includes the second mapping relationship between the plurality of first elements and the plurality of third elements, the first elements include the plurality of prior-calibrated qubit gates and fidelity intervals in which fidelities of the plurality of prior-calibrated qubit gates are located, and the third elements include at least one calibration means. After the first qubit gate and the first fidelity interval in which the first qubit gate is located are determined, a lookup is performed in the second mapping relationship set based on the first qubit gate and the first fidelity interval, to obtain the at least one calibration means corresponding to the first qubit gate and the first fidelity interval.

The second mapping relationship set is determined in advance, so that a lookup may be directly performed in the second mapping relationship set based on the first element, to obtain the third element corresponding to the first element. In other words, a lookup is performed in the second mapping relationship set based on the first qubit gate and the first fidelity interval, to obtain the at least one calibration means corresponding to the first qubit gate and the first fidelity interval.

The second mapping relationship set may be stored in a plurality of forms such as a mapping relationship table and text.

Figure 8:
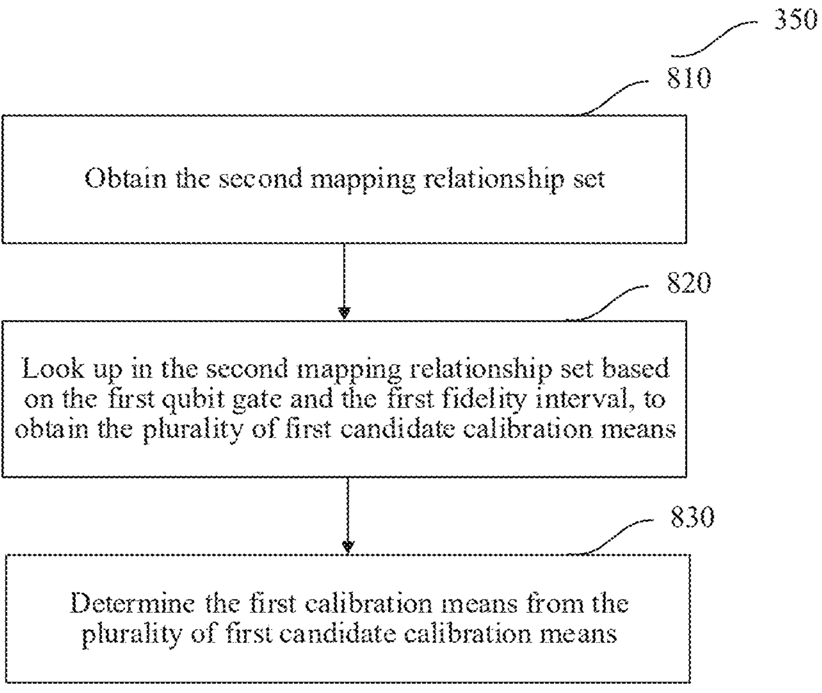
FIG. 8 is a specific flowchart of operation 350 in FIG. 3.

There may be one or more calibration means corresponding to the first fidelity interval of the first qubit gate in the second mapping relationship set. If there is one calibration means, the calibration means is directly used as the first calibration means. If there are a plurality of calibration means, as shown in FIG. 8, operation 350 includes the following operations.

Operation 810: Obtain the second mapping relationship set.

Operation 820: Look up in the second mapping relationship set based on the first qubit gate and the first fidelity interval, to obtain the plurality of first candidate calibration means.

Operation 830: Determine the first calibration means from the plurality of first candidate calibration means.

A storage location of the second mapping relationship set is not limited in this application. The second mapping relationship set may be stored in a local device, such as a terminal device that performs the method 300, or the second mapping relationship set may be stored in a cloud device, or may be stored in another device. Obtaining the second mapping relationship set includes obtaining the locally stored second mapping relationship set, or the second mapping relationship set stored by the cloud device.

In this embodiment, the second mapping relationship set is stored in the form of the mapping relationship table. A second mapping relationship table includes the first mapping relationship between the plurality of first elements and the plurality of third elements, the first element includes the plurality of prior-calibrated qubit gates and the fidelity interval in which fidelities of the plurality of prior-calibrated qubit gates are located, and the third element includes a plurality of first candidate calibration means. Table 2 shows an example of the second mapping relationship table.

TABLE 2

| Second mapping relationship table | |
|---|---|
| First element: qubit gate and fidelity interval | Third element: first candidate calibration means |
| Gate X [80%, 85%) | A, E, M |
| Gate Y [80%, 85%) | B, D, H |
| Gate H [80%, 85%) | C, N |
| Gate I [80%, 85%) | A, F, K |
| Gate X [85%, 90%) | D, L, R |
| Gate Y [85%, 90%) | C, K, P |
| . . . | . . . |
| Gate H [95%, 100%) | E, G, K, M |
| Gate I [95%, 100%) | F, U |

Based on the second mapping relationship table in Table 2, when the first qubit gate is the gate X, and the first fidelity interval is [80%, 85%), the first candidate calibration means include A, E, and M.

Because the calibration means is to calibrate the fidelity of the qubit gate by adjusting a radio frequency signal of the qubit, the calibration means may be a combination of different attribute adjustment manners of the radio frequency signal.

In an embodiment, the calibration method for a qubit gate further includes: generating a plurality of calibration means based on a combination of a plurality of amplitude values, a plurality of frequency values, and a plurality of phase values.

In the embodiments of the present disclosure, because the qubit gate is a logical operation performed based on the qubit, the fidelities of the plurality of qubit gates corresponding to the qubit are an attribute of the qubit. In the embodiments of the present disclosure, the qubit may be specifically a radio frequency signal. The radio frequency signal has three main parameters: the amplitude value, the frequency value, and the phase value. The essence of calibrating the fidelity of the qubit gate is to adjust an attribute of the qubit, so as to increase the fidelity of the qubit gate. In the embodiments of the present disclosure, the attribute of the qubit is adjusted, that is, any one or more of the amplitude value, the frequency value, or the phase value of the radio frequency signal corresponding to the qubit are adjusted. Therefore, in the embodiments of the present disclosure, a specific operation of the calibration means to calibrate the fidelity of the qubit gate is to adjust any one or more of the amplitude value, the frequency value, or the phase value of the radio frequency signal corresponding to the qubit. For different calibration means, specific values of adjustment of the above three parameter values are also different. For example, the first calibration means is to increase a frequency of the radio frequency signal corresponding to the qubit by x Hz; or the second calibration means is to adjust a phase of the radio frequency signal by 20 degrees. The plurality of calibration means may be generated based on different values and different combinations of the three parameters. A calibration target of each calibration means is to approximate the fidelity of the corresponding qubit gate to the target of 100%.

In operation 820, after the second mapping relationship table is obtained, a lookup is performed in the second mapping relationship table based on the first qubit gate and the first fidelity interval, to obtain the plurality of first candidate calibration means.

The second mapping relationship table in Table 2 is used as an example. If the first qubit gate is the gate H, and the first fidelity interval is [80%, 85%), the plurality of first candidate calibration means are the calibration means C and the calibration means N.

The calibration means is generated based on different dimensions of the radio frequency signal, for example, the amplitude, the frequency, and the phase. For each dimension, a dimension value may be any value, and the calibration means cannot include all calibration means that may be generated. Therefore, after the first candidate calibration means is obtained, another calibration means may be further generated based on the plurality of first candidate calibration means, to increase the quantity of candidate calibration means.

Figure 9:
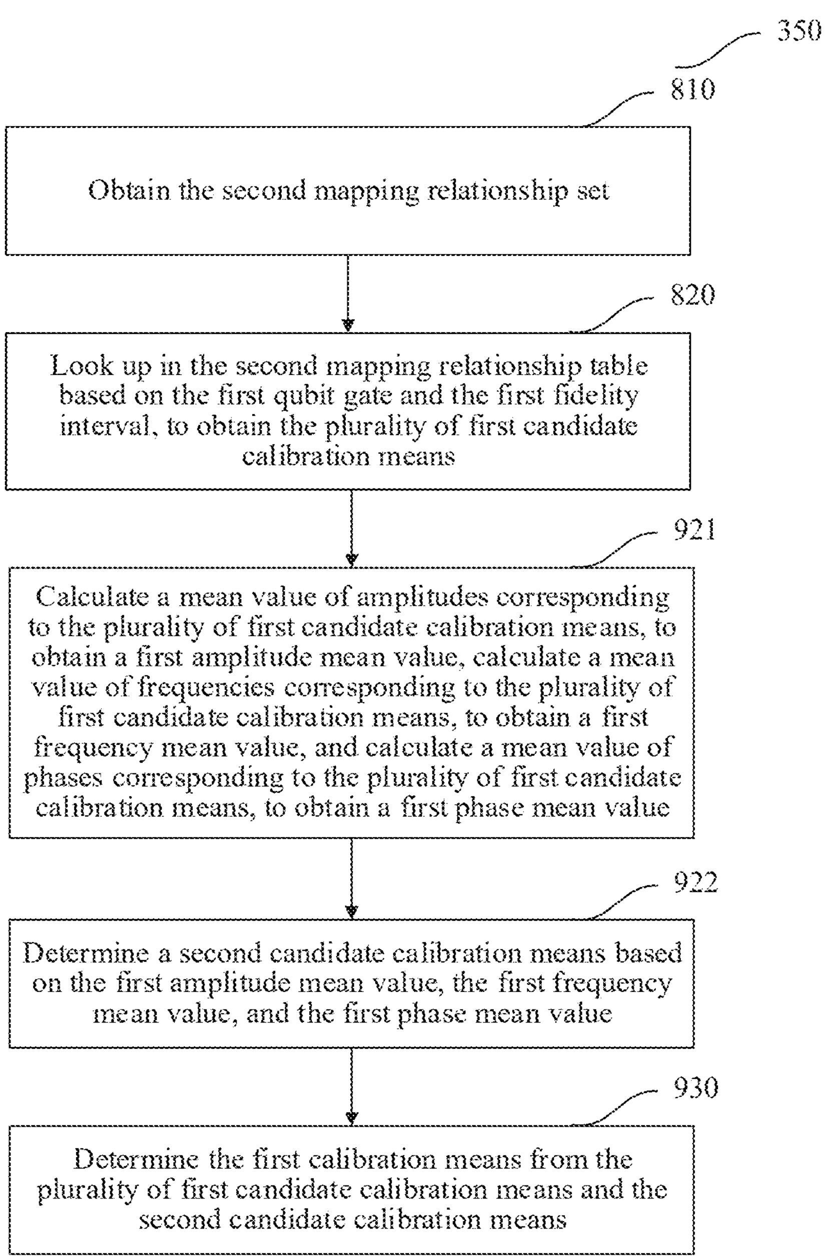
FIG. 9 is another specific flowchart of operation 350 in FIG. 3.

In an embodiment, the calibration means is to calibrate the fidelity of the qubit gate by adjusting one or more of the amplitude, the frequency, and the phase of the radio frequency signal of the qubit. As shown in FIG. 9, after operation 820, the method further includes the following operations.

Operation 921: Calculate a mean value of amplitudes corresponding to the plurality of first candidate calibration means, to obtain a first amplitude mean value, calculate a mean value of frequencies corresponding to the plurality of first candidate calibration means, to obtain a first frequency mean value, and calculate a mean value of phases corresponding to the plurality of first candidate calibration means, to obtain a first phase mean value.

Operation 922: Determine a second candidate calibration means based on the first amplitude mean value, the first frequency mean value, and the first phase mean value.

Operation 930: Determine the first calibration means from the plurality of first candidate calibration means and the second candidate calibration means.

In this embodiment, the calibration means is combined by one or more of the amplitude, the frequency, and the phase. If there is only one, for example, the frequency, the calibration means is to only adjust the frequency of the radio frequency signal of the qubit. If there are more, the calibration means is to adjust parameters of multiple dimensions of the radio frequency signal of the qubit.

Because all the first candidate calibration means may generate a good calibration effect on the second qubit gate, the second candidate calibration means generated based on the plurality of dimension values of the first candidate calibration means may also generate a good calibration effect on the second qubit gate. The amplitudes of the plurality of first candidate calibration means are averaged, to obtain the first amplitude mean value, the frequencies are averaged, to obtain the first frequency mean value, and the phases are averaged, to obtain the first phase mean value. For example, the generating a second candidate calibration means based on a plurality of first candidate calibration means is shown in Table 3.

TABLE 3

Example table of generating a second candidate calibration means based on a plurality of first candidate calibration means

| | Amplitude | Frequency | Phase |
|---|---|---|---|
| Calibration means A | Increase by 4 dB | Decrease by 3 MHz | Decrease by 8 degrees |
| Calibration means B | Increase by 2 dB | — | Decrease by 7 degrees |
| Calibration means C | — | Decrease by 3 MHz | — |
| Calibration means D | — | Decrease by 6 MHz | Decrease by 9 degrees |
| Second candidate calibration means | Increase by 3 dB | Decrease by 4 MHz | Decrease by 8 degrees |

Based on the calibration means A to the calibration means D in Table 3, the amplitude, the frequency, and the phase are sequentially averaged, to obtain a second candidate calibration means of increasing the amplitude by 3 dB, decreasing the frequency by 4 MHz, and decreasing the phase by 8 degrees.

Then, the first calibration means may be determined from a calibration means set formed through the first candidate calibration means and the second candidate calibration means.

In the foregoing embodiments, each first candidate calibration means in the second mapping relationship table includes a calibration weight. Therefore, the second candidate calibration means is determined based on the amplitudes, the frequencies, and the phases of the plurality of first candidate calibration means. A weighted average of the amplitudes of the plurality of first candidate calibration means may alternatively be calculated, to obtain a second amplitude mean, a weighted average of the frequencies of the plurality of first candidate calibration means is calculated, to obtain a second frequency mean, a weighted average of the phases of the plurality of first candidate calibration means is calculated, to obtain a second phase mean, and the second candidate calibration means is determined based on the second amplitude mean value, the second frequency mean value, and the second phase mean value.

Because a higher calibration weight represents a greater increase in the fidelity of the second qubit gate through the first candidate calibration means. Therefore, when the second candidate calibration means is generated, the dimension value may be offset toward the first candidate calibration means with a higher weight. For example, generating the second candidate calibration means based on the plurality of first candidate calibration means and based on the calibration weight is shown in Table 4.

TABLE 4

Example table of generating a second candidate calibration means based on a plurality of first candidate calibration means

| | Amplitude | Frequency | Phase |
|---|---|---|---|
| Calibration means A (0.3) | Increase by 4 dB | Decrease by 3 MHz | Decrease by 8 degrees |
| Calibration means B (0.4) | Increase by 2 dB | — | Decrease by 7 degrees |
| Calibration means C (0.2) | — | Decrease by 3 MHz | — |
| Calibration means D (0.1) | — | Decrease by 6 MHz | Decrease by 9 degrees |
| Second candidate calibration means | Increase by 2.86 dB | Decrease by 3.5 MHz | Decrease by 7.625 degrees |

Based on the calibration means A to the calibration means D in Table 4, a weighted mean value is sequentially calculated on the amplitudes, the frequencies, and the phases based on the calibration weight of each first candidate calibration means, to obtain a second calibration means that the amplitude increases by 2.86 dB, the frequency decreases by 3.5 MHz, and the phase decreases by 7.625 degrees.

An advantage of generating the second candidate calibration means by using the weighted average is that the second candidate calibration means may be closer to the first candidate calibration means that can bring a better calibration effect for the fidelity of the second qubit gate, which is beneficial to improving a calibration effect of the second candidate calibration means on the fidelity of the second qubit gate.

In this embodiment, the second candidate calibration means is generated based on the plurality of first candidate calibration means. The second candidate calibration means may bring a better calibration effect than the plurality of first candidate calibration means, which improves a capability of exploring a better calibration means, and further improves calibration efficiency of the fidelity of the plurality of qubit gates.

In operation 830, the first calibration means is determined from the plurality of first candidate calibration means. Based on the above one embodiment, the second mapping relationship table records the calibration weight of each first candidate calibration means. Therefore, the first calibration means may be directly determined from the plurality of first candidate calibration means based on the calibration weight.

Figure 10:
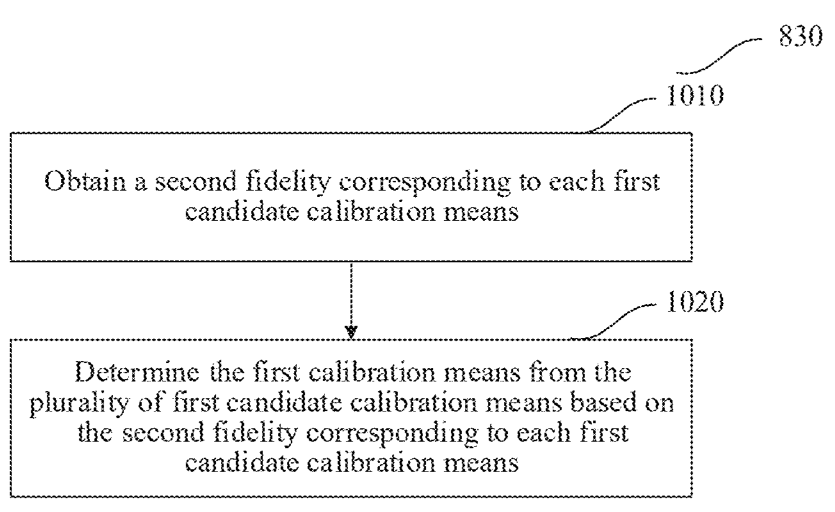
FIG. 10 is a specific flowchart of operation 830 in FIG. 8.

In another embodiment, as shown in FIG. 10, operation 830 includes the following operations.

Operation 1010: Determine a second fidelity corresponding to each first candidate calibration means.

Operation 1020: Determine the first calibration means from the plurality of first candidate calibration means based on the second fidelity corresponding to each first candidate calibration means.

In some embodiments, the determining a second fidelity corresponding to each first candidate calibration means includes:

applying each first candidate calibration means to the qubit, and performing the gate operation on the qubit by using the second qubit gate, to obtain an actual gate operation result; and determining the second fidelity corresponding to each first candidate calibration means based on the obtained actual gate operation result and an expected gate operation result, where the expected gate operation result is a theoretical operation result of performing the gate operation on the qubit by using the second qubit gate.

In some embodiments, the determining the first calibration means from the plurality of first candidate calibration means based on the second fidelity corresponding to each first candidate calibration means includes:

selecting a first candidate calibration means with the highest second fidelity from the second fidelities corresponding to the plurality of first candidate calibration means as the first calibration means.

In this embodiment, each first candidate calibration means is used to calibrate the second qubit gate of the qubit, and the first candidate calibration means with the best calibration effect is used as the first calibration means, which improves accuracy of determining the first calibration means.

Figure 11:
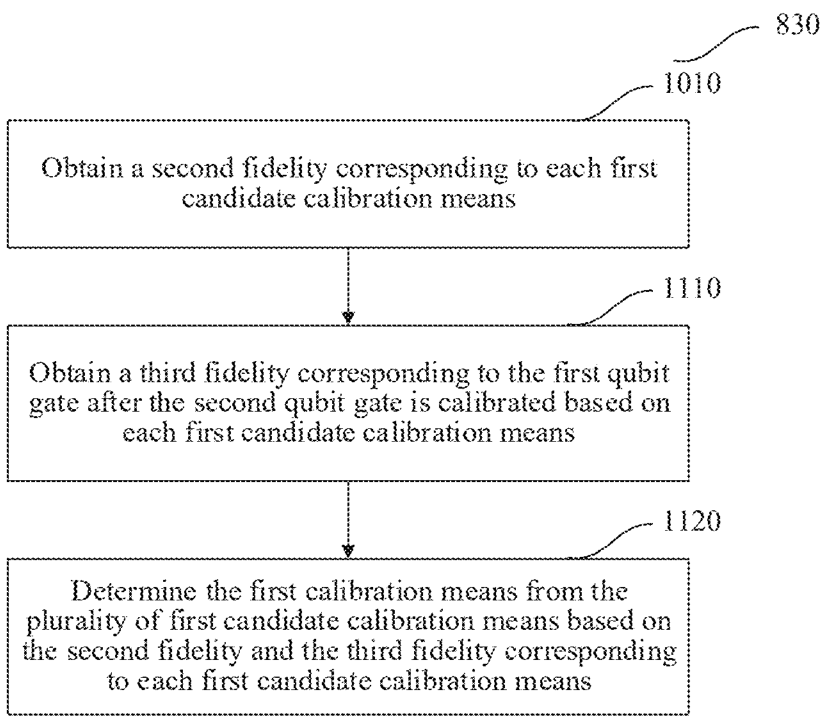
FIG. 11 is another specific flowchart of operation 1020 in FIG. 10.

Because calibration for one qubit gate may affect fidelities of other qubit gates, based on the embodiments of operation 1010 to operation 1020, in an embodiment, as shown in FIG. 11, after operation 1010, the method further includes the following operations.

Operation 1110: Obtain a third fidelity corresponding to the first qubit gate after the second qubit gate is calibrated based on each first candidate calibration means.

Operation 1120: Determine the first calibration means from the plurality of first candidate calibration means based on the second fidelity and the third fidelity corresponding to each first candidate calibration means.

In some embodiments, the obtaining a third fidelity corresponding to the first qubit gate after the second qubit gate is calibrated based on each first candidate calibration means includes:

performing the gate operation on the qubit by using the first qubit gate after the second qubit gate is calibrated through each first candidate calibration means, to obtain the actual gate operation result; and determining the third fidelity of the first qubit gate based on the obtained actual gate operation result and the expected gate operation result, where the expected gate operation result is a theoretical operation result of performing the gate operation on the qubit by using the first qubit gate.

In the embodiments of the present disclosure, after the second fidelity (indicating the calibration effect of the calibration means on the second qubit gate) corresponding to each calibration means is determined, the third fidelity (indicating an impact of the calibration means on the fidelity of the first qubit gate when the second qubit gate is calibrated through the calibration means) corresponding to each calibration means may be further determined, and then an optimal candidate calibration means may be further comprehensively evaluated as the first calibration means based on the second fidelity and the third fidelity.

Figure 12:
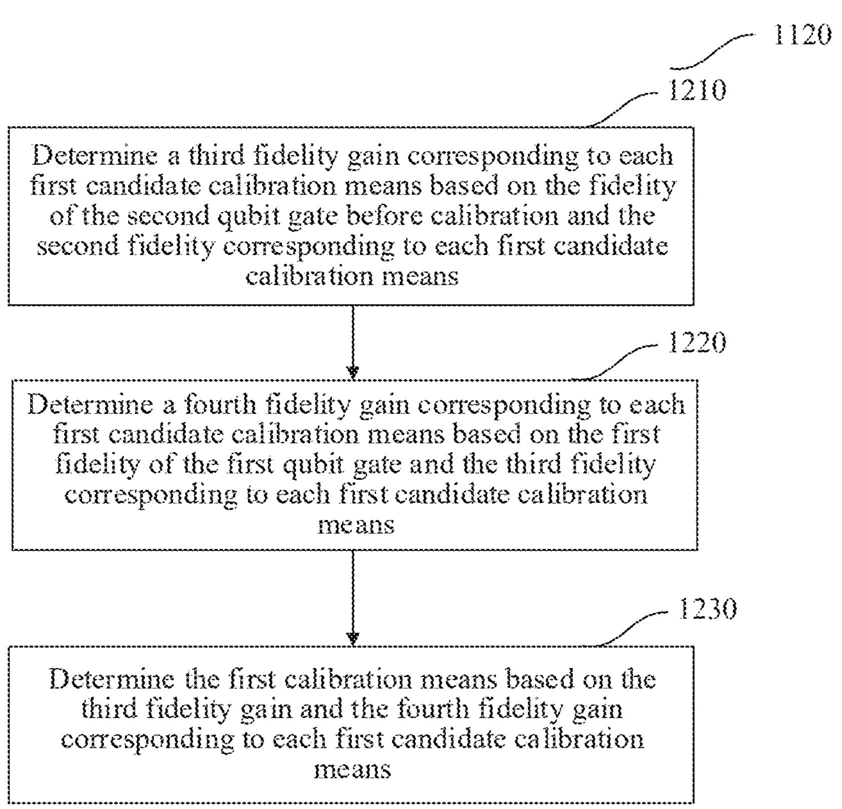
FIG. 12 is a specific flowchart of operation 1120 in FIG. 11.

In an embodiment, as shown in FIG. 12, operation 1120 includes the following operations.

Operation 1210: Determine a third fidelity gain corresponding to each first candidate calibration means based on the fidelity of the second qubit gate before calibration and the second fidelity corresponding to each first candidate calibration means.

Operation 1220: Determine a fourth fidelity gain corresponding to each first candidate calibration means based on the first fidelity of the first qubit gate and the third fidelity corresponding to each first candidate calibration means.

Operation 1230: Determine the first calibration means from the plurality of first candidate calibration means based on the third fidelity gain and the fourth fidelity gain corresponding to each first candidate calibration means.

In this embodiment, for each first candidate calibration means, a difference between the fidelities before and after the second qubit gate is calibrated is obtained as the third fidelity gain, and a fidelity difference of the first qubit gate before and after the second qubit gate is calibrated is obtained as the fourth fidelity gain. For example, before the second qubit gate is calibrated, the fidelity of the second qubit gate is 80%, and the first fidelity of the first qubit gate is 83%. After the second qubit gate is calibrated through the first candidate calibration means, the second fidelity of the second qubit gate is 92%, and the third fidelity of the first qubit gate is 80%. In this case, the third fidelity gain corresponding to the first candidate calibration means is 92%−80%=12%, and the fourth fidelity gain is 80%−83%=−3%.

In some embodiments, the determining the first calibration means from the plurality of first candidate calibration means based on the third fidelity gain and the fourth fidelity gain corresponding to each first candidate calibration means includes:

using the first candidate calibration means with the maximum addition result as the first calibration means by directly adding the third fidelity gain and the fourth fidelity gain corresponding to each first candidate calibration means.

For example, the third fidelity gain of the calibration means A is 12%, and the fourth fidelity gain is −3%; the third fidelity gain of the calibration means B is 8%, and the fourth fidelity gain is 3%; and the third fidelity gain of the calibration means C is 7%, and the fourth fidelity gain is 1%. The third fidelity gains and the fourth fidelity gains of the three calibration means are added respectively, to obtain 9%, 11%, and 8%, and the calibration means B corresponding to 11% is used as the first calibration means.

Impacts of the third fidelity gain and the fourth fidelity gain on determining the first calibration means are the same through direct summation, so that fairness in determining the first calibration means is improved.

The first calibration means is determined based on the third fidelity gain and the fourth fidelity gain corresponding to each first candidate calibration means. Alternatively, different weights are set for the third fidelity gain and the fourth fidelity gain, a weighted sum is performed based on the weights, and the first candidate calibration means with the maximum weighted sum result is used as the first calibration means. A purpose of setting the weight is that because the first candidate calibration means acts on the second qubit gate, the fidelity of the first qubit gate continues to be calibrated afterwards, and a fidelity change of the second qubit gate is more important for determining the first calibration means. Therefore, a bias of fidelity changes of the first qubit gate and the second qubit gate is represented by using the weight. For example, a weight of the third fidelity gain is 0.7, and a weight of the fourth fidelity gain is 0.3. Based on the foregoing example, a result of performing the weighted sum for the calibration means A is 7.5%, a result of performing the weighted sum for the calibration means B is 6.5%, and a result of performing the weighted sum for the calibration means C is 5.2%. Therefore, the calibration means A is used as the first calibration means. Through the weighted sum manner, different weights may be set for the third fidelity gain and the fourth fidelity gain according to a requirement of an actual application, so that flexibility of determining the first calibration means is improved.

In the embodiments of operation 1210 to operation 1230, an overall impact of each first candidate calibration means on the fidelities of the first qubit gate and the second qubit gate after the second qubit gate is calibrated is comprehensively considered, and the first candidate calibration means most beneficial to the overall is used as the first calibration means, so that accuracy of determining the first calibration means is improved.

In another embodiment, the determining the first calibration means based on the second fidelity and the third fidelity corresponding to the first candidate calibration means includes:

sorting the first candidate calibration means based on a descending order of the second fidelity; and looping the following operations starting from the first candidate calibration means in the sorting:

comparing the first fidelity with the third fidelity corresponding to the first candidate calibration means; and terminating the looping if the third fidelity is greater than or equal to the first fidelity, and using the corresponding first candidate calibration means as the first calibration means.

Figure 13:
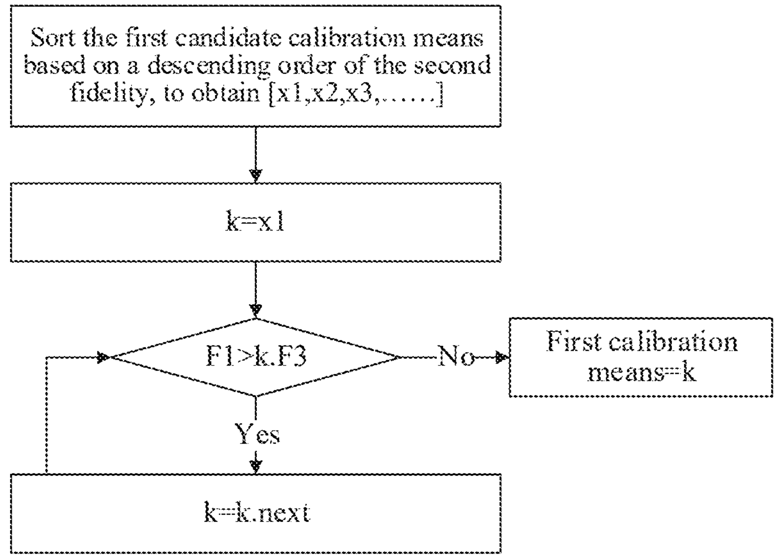
FIG. 13 is a flowchart of determining a first calibration means.

A specific process of this embodiment is shown in FIG. 13, where x represents the calibration means, and the first candidate calibration means are sorted based on the descending order of the second fidelity, to obtain [x1, x2, x3, . . . ]; k represents the first candidate calibration means of a current looping operation, and is determined starting from the first candidate calibration means in the sorting (corresponding to the highest second fidelity); F1 represents the first fidelity of the first qubit gate; and k. F3 represents the third fidelity corresponding to the first candidate calibration means represented by k. If the first fidelity is greater than the third fidelity, it represents that after the second qubit gate is calibrated through the first candidate calibration means represented by k, the fidelity of the first qubit gate decreases. Even if this first candidate calibration means may bring a good calibration effect to the fidelity of the second qubit gate, this first candidate calibration means is not an optimal selection. Therefore, the operation is continuously looped on a next first candidate calibration means in the sorting. If the first fidelity is less than or equal to the third fidelity, it represents that the fidelity of the first qubit gate is not negatively affected after the second qubit gate is calibrated through the first candidate calibration means represented by k. Therefore, this first candidate calibration means may be used as the first calibration means.

For example, the first fidelity of the first qubit gate is 80%, the second fidelity corresponding to the calibration means A is 90%, and the third fidelity is 78%. The second fidelity corresponding to the calibration means B is 86%, and the third fidelity is 81%. The second fidelity corresponding to the calibration means C is 84%, and the third fidelity is 83%. An order obtained after sorting based on the second fidelities is: the calibration means A, the calibration means B, and the calibration means C. For the calibration means A, the third fidelity is less than the first fidelity. Therefore, the calibration means B is continuously queried. For the calibration means B, the third fidelity is greater than the first fidelity. Therefore, the calibration means B is used as the first calibration means.

An advantage of this embodiment is that, while the fidelity changes of the first qubit gate and the second qubit gate are comprehensively considered, there is no need to calculate a fidelity impact of each calibration means on the first qubit gate and the second qubit gate, so that an amount of calculation is reduced, and the efficiency of determining the first calibration means is improved.

An advantage of the embodiment of FIG. 13 is that when the first calibration means is determined, both an impact of the first candidate calibration means on the second qubit gate and an impact on the first qubit gate are considered, which avoids a problem that a fidelity of one qubit gate increases and a fidelity of another qubit gate decreases, ensures the overall fidelity calibration effect of the plurality of qubit gates, and improves efficiency of overall fidelity calibration.

In the embodiments of operation 340 and operation 350, the second qubit gate is determined based on the first mapping relationship, and the first calibration means is determined based on the second mapping relationship. There is no need to traverse the plurality of qubit gates and a large quantity of calibration means, which improves the efficiency of determining the second qubit gate and the first calibration means.

It can be learned from the above that, the first mapping relationship set and the second mapping relationship set are both pre-stored sets. Therefore, the second qubit gate may be determined based on the first mapping relationship, and the first calibration means may be determined based on the second mapping relationship. There is no need to traverse a plurality of qubit gates and a large quantity of calibration means, which improves efficiency of determining the second qubit gate and the first calibration means. How to determine the first mapping relationship set and the second mapping relationship set is described below.

The qubit gate performs the gate operation on the qubit by applying a radio frequency modulation signal to the qubit. The calibration means for calibrating the qubit gate is to adjust the radio frequency modulation signal of the qubit, so that the gate operation result of the qubit is close to the expected state. For one qubit, there is an association between the plurality of qubit gates, and a fidelity of one qubit gate may affect a calibration effect of the qubit gate that is subsequently calibrated. For example, only when the fidelity of the gate X reaches 85%, the gate H can be calibrated to obtain a good calibration effect. If the to-be-calibrated qubit gate is randomly selected, a poor calibration effect may be caused, and a case that a fidelity of one qubit gate increases, but a fidelity of another qubit gate decreases may also occur. Therefore, the association between the qubit gates needs to be considered, and the target second qubit gate is determined based on the fidelity of the first qubit gate.

The first calibration means for calibrating the second qubit gate is also related to the first fidelity of the first qubit gate. This is because an effect of calibrating other qubit gates can only be achieved when the first fidelity of the first qubit gate reaches a pre-determined standard. If the calibration means is randomly selected, fidelities of other qubit gates may be decreased. In other words, the second qubit gate determined based on the first fidelity and the first calibration means for calibrating the second qubit gate are all selections that can improve the fidelity of the overall qubit gate based on the first fidelity, and generally are selections that maximize the increase of the fidelity of the overall qubit gate.

In some embodiments, the determining the second qubit gate and the first calibration means based on the first fidelity may be performed by combining qubit gates other than the first qubit gate and the plurality of calibration means. The qubit gates in the combination are calibrated through the calibration means in the combination, fidelity gains before and after calibration are obtained, the qubit gate in the combination with the maximum fidelity gain is used as the second qubit gate, and the calibration means is used as the first calibration means. For example, the qubit gates other than the first qubit gate include a gate X and a gate Y, and the calibration means include the calibration means A, the calibration means B, and the calibration means C. In this case, after combination, (gate X, calibration means A), (gate X, calibration means B), (gate X, calibration means C), (gate Y, calibration means A), (gate Y, calibration means B), and (gate Y, calibration means C) are obtained. The gate X is calibrated through the calibration means A, and the fidelity increases from 75% to 90% before and after calibration, so that the fidelity gain is 15%. The gate X is calibrated through the calibration means B, and the fidelity before and after calibration decreases from 75% to 70%, so that the fidelity gain is −5%. The rest can be deduced by analogy. The fidelity gains before and after each combination calibration are obtained. If the fidelity gain obtained after the gate X is calibrated through the calibration means A is the maximum, the second quantum gate is the gate X, and the first calibration means is the calibration means A.

Because a large quantity of qubit gate operations need to be performed on the qubit, and there are a quantity of calibration means for calibration, a large quantity of combinations of the qubit gates and the calibration means are generated. When the qubit gates are calibrated, the qubit gates are tested one by one, and the qubit gate with the best calibration effect is selected from the qubit gates, which is inefficient. Therefore, the first mapping relationship set and the second mapping relationship set may be pre-determined based on experiments, and the second qubit gate and the first calibration means are determined based on the first fidelity.

Figure 14:
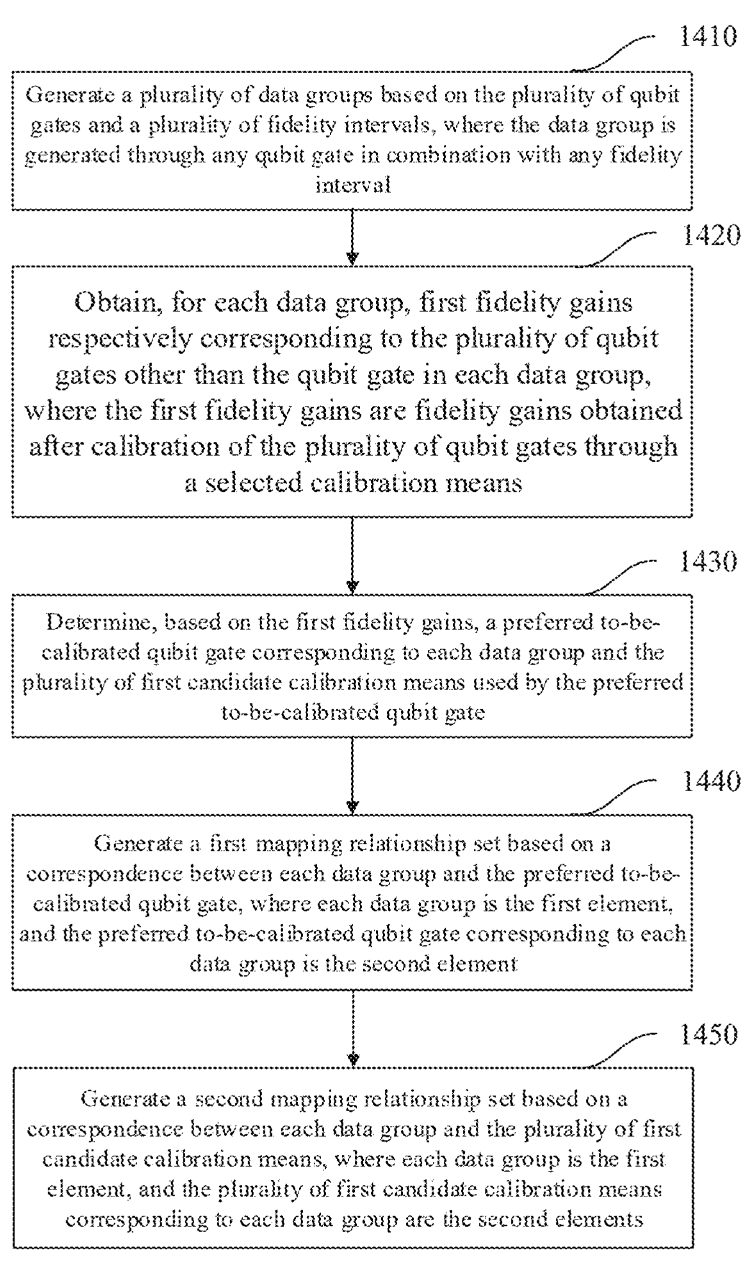
FIG. 14 is a specific flowchart of generating a first mapping relationship set and a second mapping relationship set.

In an embodiment, as shown in FIG. 14, the first mapping relationship set and the second mapping relationship set are generated in the following manners.

Operation 1410: Generate a plurality of data groups based on the plurality of qubit gates and a plurality of fidelity intervals, where the data group is generated through any qubit gate in combination with any fidelity interval.

Operation 1420: Obtain, for each data group, first fidelity gains respectively corresponding to the plurality of qubit gates other than the qubit gate in each data group, where the first fidelity gains are fidelity gains obtained after calibration of the plurality of qubit gates through a selected calibration means.

Operation 1430: Determine, based on the first fidelity gains, a preferred target qubit gate corresponding to each data group and the plurality of first candidate calibration means used by the preferred target qubit gate.

Operation 1440: Generate the first mapping relationship set based on a correspondence between each data group and the preferred target qubit gate, where each data group is the first element, and the preferred target qubit gate corresponding to each data group is the second element.

Operation 1450: Generate the second mapping relationship set based on a correspondence between each data group and the plurality of first candidate calibration means, where each data group is the first element, and the plurality of first candidate calibration means corresponding to each data group are the second elements.

In operation 1410, each of the plurality of qubit gates is combined with each fidelity interval, to obtain a plurality of data groups. For example, the qubit gates include the gate X and the gate Y, and the fidelity intervals include [85%, 90%), [90%, 95%), and [95%, 100%). In this case, the generated data groups include (gate X, [85%, 90%)), (gate X, [90%, 95%)), (gate X, [95%, 100%)), (gate Y, [85%, 90%)), (gate Y, [90%, 95%)), and (gate Y, [95%, 100%)).

In operation 1420, for each data group, first fidelity gains respectively corresponding to a plurality of qubit gates other than the qubit gate in the data group are obtained. The first fidelity gain is a difference between sums of the fidelities of the plurality of qubit gates before and after the corresponding qubit gate is calibrated. The corresponding qubit gate is each of the plurality of qubit gates other than the qubit gate in the data group. For each qubit gate, the difference between the sums of the fidelities of the plurality of qubit gates before and after calibration is obtained as the first fidelity gain.

In some embodiments, the obtaining first fidelity gains corresponding to the qubit gates respectively other than the qubit gate in the data group after calibration includes:

- obtaining a first sum of the fidelities of the plurality of qubit gates before a third qubit gate in each data group is calibrated, where the third qubit gate is any qubit gate of the plurality of qubit gates;
- obtaining a second sum of the fidelities of the plurality of qubit gates after the third qubit gate in each data group is calibrated through a third candidate calibration means; and
- determining a first fidelity gain of the third qubit gate in each data group based on the first sum of the fidelities of the plurality of qubit gates and the second sum of the fidelities of the plurality of qubit gates.

Figure 15:
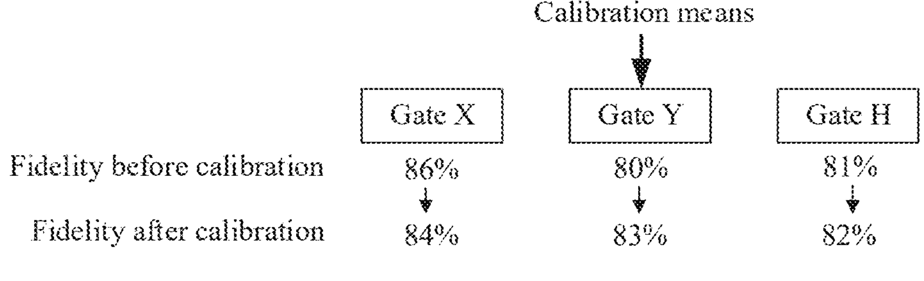
FIG. 15 is a schematic diagram of fidelity changes of a plurality of qubit gates after a qubit gate is calibrated.

For example, as shown in FIG. 15, the qubit gates include the gate X, the gate Y, and the gate H. When a preferred calibrated qubit gate in a data group of (gate X, [85%, 90%)) is determined, first fidelity gains of the gate Y and the gate H are obtained respectively. The first fidelity gain of the gate Y is a difference between a second sum of fidelities of the gate X, the gate Y, and the gate H after the gate Y is calibrated through a calibration means and a first sum of fidelities before the calibration. If the fidelities of the gate X, the gate Y, and the gate H are 86%, 80%, and 81% respectively before the gate Y is calibrated through a calibration means, and a sum thereof is the first sum of the fidelities of the gate X, the gate Y, and the gate H, after the gate Y is calibrated through a calibration means, the fidelities of the gate X, the gate Y, and the gate H are 84%, 83%, and 82% respectively, and a sum thereof is the second sum of the fidelities of the gate X, the gate Y, and the gate H. Then, the first fidelity gain of the gate Y is a value obtained by subtracting the first sum from the second sum, that is, (84%+83%+82%)−(86%+80%+81%)=2%. Similarly, the first fidelity gain of the gate H is a difference between the second sum of the fidelities of the gate X, the gate Y, and the gate H after the gate H is calibrated through a calibration means and the first sum of the fidelities before the calibration.

In some embodiments, the obtaining a first sum of the fidelities of the plurality of qubit gates before a third qubit gate in each data group is calibrated includes:

- calculating, based on weights of the plurality of qubit gates, the first sum of the fidelities of the plurality of qubit gates before the third qubit gate in each data group is calibrated.

In some embodiments, the obtaining a second sum of the fidelities of the plurality of qubit gates after the third qubit gate in each data group is calibrated through a third candidate calibration means includes:

- calculating the first sum of the fidelities of the plurality of qubit gates and the second sum of the fidelities of the plurality of qubit gates based on the weights of the plurality of qubit gates.

For example, as shown in FIG. 15, the qubit gates include the gate X, the gate Y, and the gate H. A weight corresponding to the gate X is 0.3, a weight corresponding to the gate Y is 0.5, and a weight corresponding to the gate H is 0.2. If the fidelities of the gate X, the gate Y, and the gate H are 86%, 80%, and 81% respectively before the gate Y is calibrated through a calibration means, the first sum of the fidelities of the gate X, the gate Y, and the gate H is a sum of a result obtained by multiplying a weight corresponding to each gate by the fidelity of each gate, for specific example, 0.3*86%+0.5*80%+0.2*81%=82.9%

After calibration is performed through a calibration means, the fidelities of the gate X, the gate Y, and the gate H are 84%, 83%, and 82% respectively. The second sum of the fidelities of the gate X, the gate Y, and the gate H is a sum of a result obtained by multiplying a weight corresponding to each gate by the fidelity of each gate, for specific example, 0.3*84%+0.5*83%+0.2*82%=83.1%.

When the gate Y and the gate H are calibrated, a plurality of different calibration means may be selected. For example, the calibration means include the calibration means A, the calibration means B, the calibration means C, and the calibration means D. The gate Y may be first calibrated through the calibration means A, the calibration means B, the calibration means C, and the calibration means D respectively, to obtain the first fidelity gains obtained after the gate Y is calibrated through different calibration means.

Then, the gate H is calibrated through the calibration means A, the calibration means B, the calibration means C, and the calibration means D respectively, to obtain the first fidelity gains of the gate H after calibration through different calibration means.

Then, the preferred calibrated qubit gate corresponding to the data group of (gate X, [85%, 90%)) and a first candidate calibration means for calibrating the preferred calibrated qubit gate are determined based on the first fidelity gains of the gate Y after calibration through different calibration means and the first fidelity gains of the gate H after calibration through different calibration means.

FIG. 15 is used as an example. When the preferred calibrated qubit gate in the data group of (gate X, [85%, 90%)) is determined, specific operations are as follows.

The fidelities of the gate X, the gate Y, and the gate H are 86%, 80%, and 81% respectively before the other qubit gates are calibrated through a calibration means.

After the gate Y is calibrated through the calibration means A, the fidelities of the gate X, the gate Y, and the gate H are 84%, 83%, and 82% respectively. Then, the first fidelity gain of the gate Y through the calibration means A is (84%+83%+82%)−(86%+80%+81%)=2%.

After the gate Y is calibrated through the calibration means B, the fidelities of the gate X, the gate Y, and the gate H are 85%, 84%, and 81% respectively. Then, the first fidelity gain of the gate Y through the calibration means A is (85%+84%+81%)−(86%+80%+81%)=3%.

After the gate H is calibrated through the calibration means A, the fidelities of the gate X, the gate Y, and the gate H are 83%, 82%, and 82% respectively. Then, the first fidelity gain of the gate Y through the calibration means A is (83%+82%+82%)−(86%+80%+81%)=0%.

After the gate H is calibrated through the calibration means B, the fidelities of the gate X, the gate Y, and the gate H are 82%, 84%, and 82% respectively. Then, the first fidelity gain of the gate Y through the calibration means A is (82%+84%+82%)−(86%+80%+81%)=1%.

After the gate Y is calibrated through the calibration means B, the first fidelity gain is the maximum. Therefore, the qubit gate Y with the maximum first fidelity gain is selected as the preferred calibrated qubit gate corresponding to the data group of (gate X, [85%, 90%)), and the calibration means B is selected as the first candidate calibration means.

Calibrating the fidelity of one qubit gate affects the fidelities of other qubit gates. Even if the fidelity before and after calibration of the qubit gate increases by a high amplitude, the fidelities of the other qubit gates may decrease. Therefore, the difference between the sums of the fidelities of the plurality of qubit gates before and after calibration is used as the first fidelity gain, and the preferred calibrated qubit gate with the best calibration effect on the whole may be obtained from the plurality of qubit gates.

After the first fidelity gain corresponding to each qubit gate other than the qubit gate in the data group is obtained, the preferred target qubit gate corresponding to the data group is determined based on the first fidelity gains of the plurality of qubit gates. A higher first fidelity gain corresponding to the qubit gate indicates that calibration of the qubit gate based on the data group leads to a higher increase effect on the overall fidelity. Therefore, the qubit gate with the highest first fidelity gain may be used as the preferred target qubit gate in the data group, to generate the first mapping relationship between the data group and the preferred target qubit gate. The calibration means with the highest first fidelity gain is used as the calibration means for calibrating the preferred target qubit gate in the data group, to generate the first mapping relationship between the data group and the first candidate calibration means.

In operation 1430, the determining, based on the first fidelity gains, a preferred target qubit gate corresponding to each data group and the plurality of first candidate calibration means used by the preferred target qubit gate includes:

when the first fidelity gain after calibration through the third candidate calibration means used by the third qubit gate is greater than a gain threshold, determining the third qubit gate as a preferred target qubit gate corresponding to the data group, and determining the third candidate calibration means as a candidate calibration means corresponding to the data group.

Specifically, the preferred target qubit gate and the candidate calibration means may be determined from the plurality of qubit gates and the plurality of calibration means by setting the gain threshold. If the first fidelity gain after a qubit gate is calibrated through a calibration means is greater than or equal to the gain threshold, the qubit gate is used as the preferred target qubit gate, and the calibration means is used as one candidate calibration means. For example, if the gain threshold is 2%, according to the foregoing example, the first fidelity gain of the gate Y is 3% or 2% after the gate Y is calibrated through the calibration means A and the calibration means B, and may reach the gain threshold. The first fidelity gain is 0% or 1% after the gate H is calibrated through the calibration means A and the calibration means B, and does not reach the gain threshold. Therefore, it is determined that the gate Y is a preferred target qubit gate in the data group of (gate X, [85%, 90%)), and the calibration means A and the calibration means B may be used as the candidate calibration means in the data group of (gate X, [85%, 90%)). The gain threshold is used to determine the preferred target qubit gate and the candidate calibration means, which can ensure that each candidate calibration means can bring a good calibration effect to the to-be-calibrated qubit gate corresponding to the data group.

In another embodiment, when the preferred target qubit gate and the candidate calibration means are determined from the plurality of qubit gates and the plurality of calibration means, the quantity of candidate calibration means may be set, the plurality of candidate calibration means are sorted based on the first fidelity gain, and the calibration means sorted first and with the quantity being the quantity of the candidate calibration means are used as the candidate calibration means. For example, if there are two candidate calibration means, the calibration means A and the calibration means B may be used as the candidate calibration means of the data group of (gate X, [85%, 90%)) according to the foregoing example. In this embodiment, if the first fidelity gains corresponding to the plurality of calibration means exceed the gain threshold, several calibration means with high first fidelity gains may be selected from the plurality of calibration means, to determine the first calibration means from the several calibration means with high first fidelity gains, so that the efficiency of determining the first calibration means is improved.

When the second mapping relationship between the data group and the candidate calibration means is generated, the data group and the candidate calibration means, for example, generation results shown in Table 5, may be directly generated correspondingly.

TABLE 5

Second mapping relationship table between a data group and a candidate calibration means

| Qubit gate and fidelity interval | First candidate calibration means |
|---|---|
| Gate X [85%, 90%) | A, B |

In some embodiments, the calibration weight of each candidate calibration means may be further determined based on the first fidelity gain of the candidate calibration means, and the second mapping relationship is generated by corresponding the data group to the calibration weight of the candidate calibration means. The calibration weight indicates a calibration amplitude of the to-be-calibrated qubit gate corresponding to the data group by the candidate calibration means. The calibration amplitude may be specifically understood as the fidelity gain obtained through calibration. A larger calibration amplitude indicates a larger calibration weight value. For example, if the first fidelity gain of the calibration means B is 7%, and the first fidelity gain of the calibration means D is 12%, the calibration weight of the calibration means B is 7%/(7%+12%)=0.37, and the calibration weight of the calibration means D is 12%/(7%+12%)=0.63. In this case, a generation result of the second mapping relationship between the data group and the candidate calibration means is shown in Table 6.

TABLE 6

Second mapping relationship table between a data group and a candidate calibration means

| Qubit gate and fidelity interval | First candidate calibration means |
|---|---|
| Gate X [85%, 90%) | B (0.37), D (0.67) |

An advantage of recording the calibration weight in the second mapping relationship is that the calibration weight may be determined directly based on the weight when the first calibration means is determined, which improves the efficiency of determining the first calibration means.

The process of generating the first mapping relationship set and the second mapping relationship set in operation 1410 to operation 1450 is to determine the qubit gate of each data group and the candidate calibration means of each data group based on the overall calibration effect of the plurality of qubit gates, and generate the first mapping relationship set between the data group and the preferred target qubit gate, and the second mapping relationship set between the data group and the candidate calibration means. This ensures that after the second qubit gate is obtained based on the first mapping relationship set, and the first calibration means is obtained based on the first mapping relationship set, the calibration process of the fidelity of the second qubit gate is beneficial to the overall fidelity of the plurality of qubit gates Detailed Description of Operation 360

In operation 360, the second qubit gate is calibrated through the first calibration means. Essentially, the radio frequency signal of the qubit is adjusted through the first calibration means, so that the gate operation is performed on the qubit based on the second qubit gate, to make the state of the qubit as close to the expected state as possible.

Figure 16:
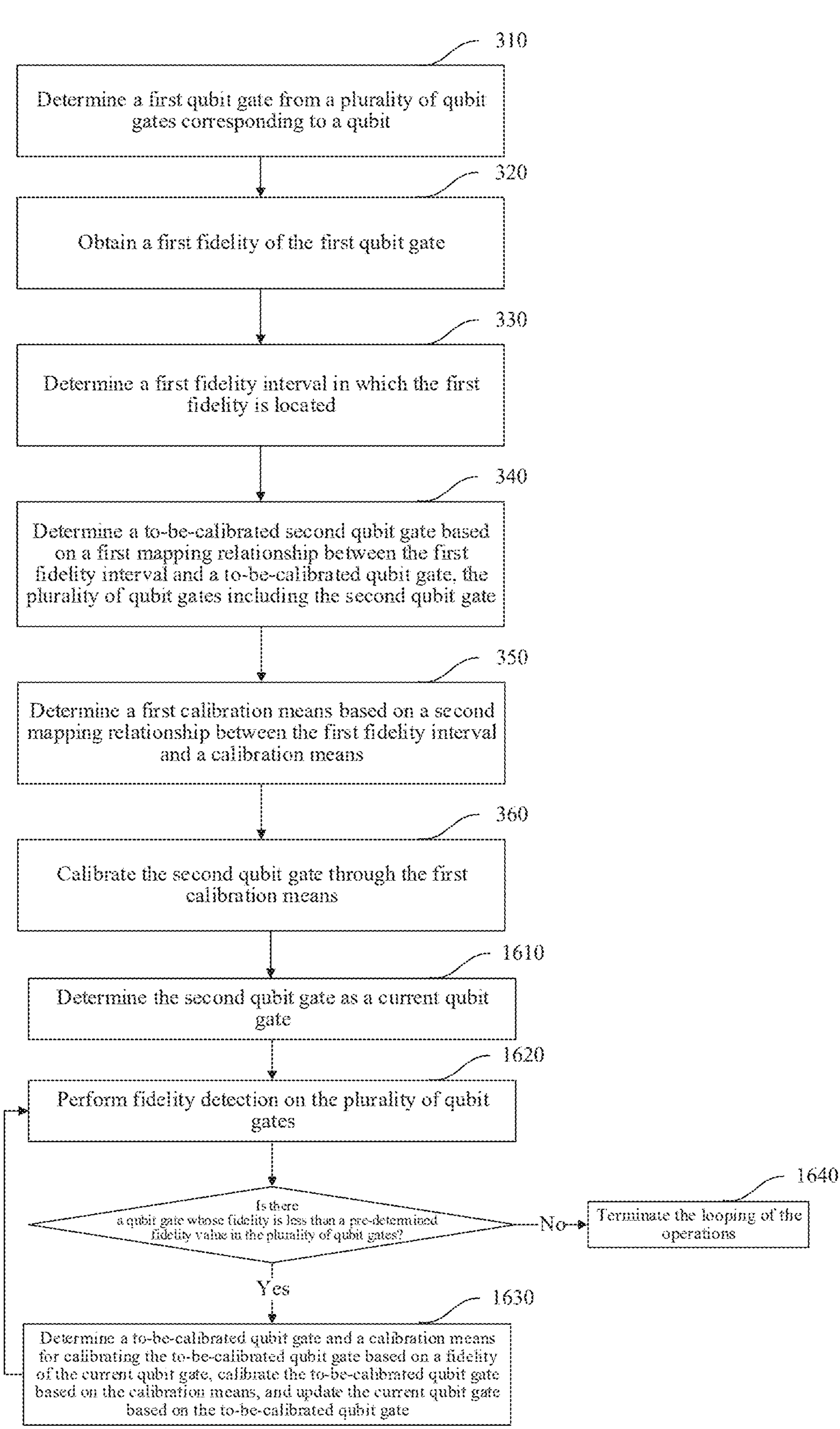
FIG. 16 is a specific flowchart of calibrating a plurality of qubit gates based on FIG. 3.

The embodiments of operation 310 to operation 360 only describe a process of calibrating one of the plurality of qubit gates of the qubit in detail, and actually, the plurality of qubit gates may be calibrated. Therefore, the embodiments of operation 310 to operation 360 may be used as a start process for calibrating the plurality of qubit gates. In an embodiment, as shown in FIG. 16, after operation 360, the method further includes the following operations.

Operation 1610: Determine the second qubit gate as a current qubit gate, and loop the following operations.

Operation 1620: Perform fidelity detection on the plurality of qubit gates.

Operation 1630: When detecting a qubit gate whose fidelity is less than a pre-determined fidelity value in the plurality of qubit gates, determine a to-be-calibrated qubit gate and a calibration means for calibrating the to-be-calibrated qubit gate based on a fidelity of the current qubit gate, calibrate the to-be-calibrated qubit gate based on the calibration means, and update the current qubit gate based on the to-be-calibrated qubit gate.

Operation 1640: Terminate the looping of the operations when the fidelities of the plurality of qubit gates are greater than or equal to the pre-determined fidelity value.

In this embodiment, after the second qubit gate is calibrated, the second qubit gate is used as the current qubit gate, and the operations are looped. Fidelity detection is performed on the plurality of qubit gates. If the fidelity of the qubit gate of the plurality of qubit gates is less than the pre-determined fidelity value, the to-be-calibrated qubit gate and the calibration means for calibrating the to-be-calibrated qubit gate are determined based on the fidelity of the current qubit gate. A specific process is the same as the determining the second qubit gate based on the first fidelity and the first calibration means in operation 340 and operation 350. Details are not described herein again. The to-be-calibrated qubit gate is calibrated based on the calibration means, and the to-be-calibrated qubit gate is used as the current qubit gate, and the operations are re-looped. If the fidelities of the plurality of qubit gates are greater than the pre-determined fidelity value, it indicates that the plurality of qubit gates meet a calibration requirement, and the looping of the operations is terminated.

The pre-determined fidelity value is a threshold at which the fidelity of the qubit gate reaches the calibration requirement. When the fidelity of the qubit gate is greater than or equal to the pre-determined fidelity value, the qubit may be used to perform the quantum computing task.

Figure 17:
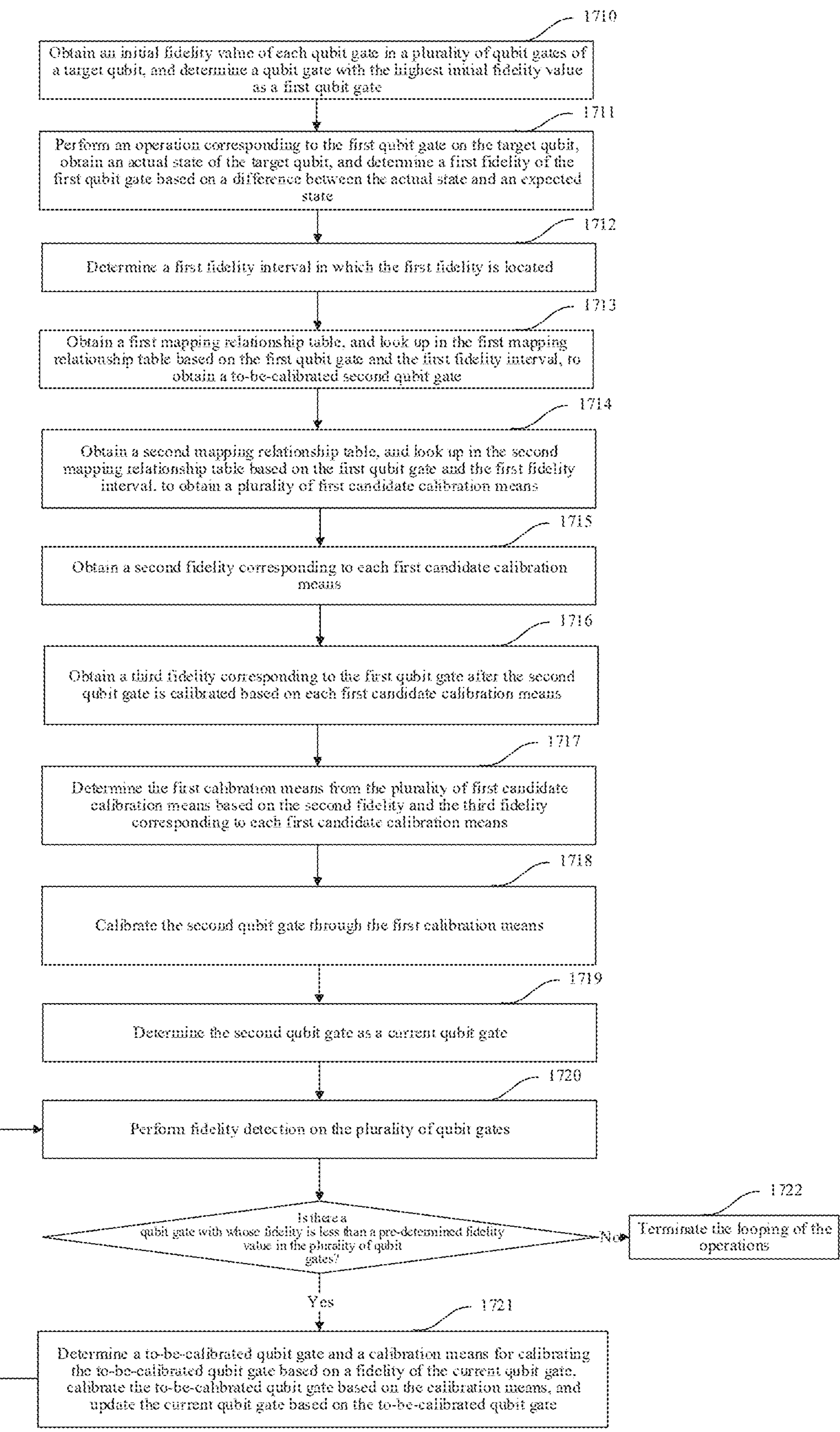
FIG. 17 is an overall diagram of implementation details of a calibration method for a qubit gate according to an embodiment of the present disclosure.

The process of calibrating a plurality of qubit gates of a qubit with reference to FIG. 17 is exemplarily described below.

For example, the qubit gates corresponding to the qubits include a gate I, a gate X, a gate Y, and a gate M, and initial fidelities are 75%, 77%, 81%, and 78% respectively.

In operation 1710, a qubit gate with the maximum initial fidelity is used as a first qubit gate, and therefore the first qubit gate is the gate Y.

In operation 1711, a gate operation of the gate Y is performed on the qubit, and the first fidelity of the first qubit gate is determined as 81% based on a difference between an actual result and an expected result of the operation.

In operation 1712, a first fidelity interval including the first fidelity is determined as [80%, 85%).

In operation 1713, a first mapping relationship table is obtained, and a target second qubit gate being the gate X is looked up in the first mapping relationship table based on the first qubit gate and the first fidelity interval.

In operation 1714, a second mapping relationship table is obtained, and a lookup is performed in the second mapping relationship table based on the first qubit gate and the first fidelity interval, to obtain a plurality of first candidate calibration means: a calibration means D, a calibration means F, and a calibration means G respectively.

In operation 1715, a second fidelity corresponding to each first candidate calibration means is obtained, a second fidelity corresponding to the calibration means D being 86%, a second fidelity corresponding to the calibration means F being 97%, and a second fidelity corresponding to the calibration means G being 95%.

In operation 1716, after the second qubit gate is calibrated based on each first candidate calibration means, a third fidelity corresponding to the first qubit gate is: a third fidelity corresponding to the calibration means D being 81%, a third fidelity corresponding to the calibration means F being 80%, and a third fidelity corresponding to the calibration means G being 82%.

In operation 1717, a first calibration means is determined from the plurality of first candidate calibration means based on the second fidelity and the third fidelity corresponding to each first candidate calibration means, the first calibration means being the calibration means G.

In operation 1718, the gate X is calibrated through the calibration means G.

In operation 1719, the gate X is determined as a current qubit gate.

Operation 1720 is performed for the first time, and fidelity detection is performed on all qubit gates. Fidelities corresponding to the gate I, the gate X, the gate Y, and the gate M are 75%, 95%, 81%, and 78% respectively. A pre-determined fidelity value is 95%. There is a qubit gate whose fidelity is less than the pre-determined fidelity value, and operation 1721 is performed.

In operation 1721: the to-be-calibrated qubit gate is determined as the gate I based on the fidelity (95%) of the gate X, and an applied calibration means is the calibration means C. The gate I is calibrated through the calibration means C, the gate I is used as the current qubit gate, and operation 1720 is performed.

Operation 1720 is performed for the second time, and fidelity detection is performed on all qubit gates. Fidelities corresponding to the gate I, the gate X, the gate Y, and the gate M are 96%, 95%, 81%, and 78% respectively. There is a qubit gate whose fidelity is less than the pre-determined fidelity value, and operation 1721 is performed.

In operation 1721, the to-be-calibrated qubit gate is determined as the gate M based on the fidelity (96%) of the gate I, and an applied calibration means is the calibration means K. The gate M is calibrated through the calibration means K, the gate M is used as the current qubit gate, and operation 1720 is performed.

Operation 1720 is performed for the third time, and fidelity detection is performed on all qubit gates. Fidelities corresponding to the gate I, the gate X, the gate Y, and the gate M are 96%, 95%, 81%, and 95% respectively. There is a qubit gate whose fidelity is less than the pre-determined fidelity value, and operation 1721 is performed.

In operation 1721, the to-be-calibrated qubit gate is determined as the gate M based on the fidelity (95%) of the gate Y, and an applied calibration means is the calibration means S. The gate Y is calibrated through the calibration means S, the gate Y is used as the current qubit gate, and operation 1720 is performed.

Operation 1720 is performed for the fourth time, and fidelity detection is performed on all qubit gates. Fidelities corresponding to the gate I, the gate X, the gate Y, and the gate M are 96%, 95%, 97%, and 95% respectively. There is no qubit gate whose fidelity is less than the pre-determined fidelity value, and operation 1722 is performed.

In operation 1722, the looping of the operations is terminated, to complete calibration of the plurality of qubit gates of the qubit.

Apparatus and Device Description of the Embodiments of the Present Disclosure In the specific implementations of this application, when it comes to the need to perform relevant processing based on data related to object characteristics such as object attribute information or an attribute information set, permission or consent of the object is first obtained. In addition, collection, use, processing, and the like of such data comply with relevant laws, regulations, and standards of relevant countries and regions. In addition, when the object attribute information needs to be obtained in the embodiments of this application, individual permission or individual consent of the object is obtained through a pop-up window or by jumping to a confirmation page. After the individual permission or individual consent of the object is explicitly obtained, necessary object related data for enabling the embodiments of this application to normally operate is obtained.

Figure 18:
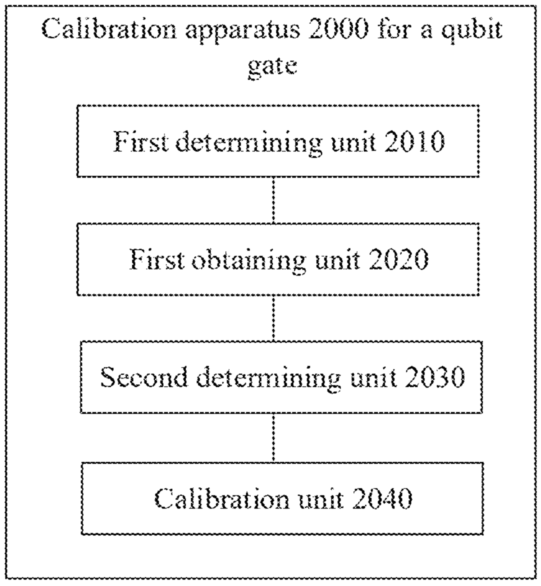
FIG. 18 is a block diagram of a calibration apparatus for a qubit gate according to an embodiment of the present disclosure.

FIG. 18 is a schematic structural diagram of a calibration apparatus 2000 for a qubit gate according to an embodiment of the present disclosure. The calibration apparatus 2000 for a qubit gate includes:

- a first determining unit 2010, configured to determine a first qubit gate from a plurality of qubit gates for processing a qubit;
- a first obtaining unit 2020, configured to obtain a first fidelity of the first qubit gate; and
- a second determining unit 2030, configured to determine a first fidelity interval including the first fidelity from a plurality of preset fidelity intervals,
- the second determining unit 2030 being further configured to determine a target second qubit gate from the plurality of qubit gates based on the first qubit gate and the first fidelity interval and based on a pre-stored first mapping relationship set, the first mapping relationship set including a first mapping relationship between a plurality of first elements and a plurality of second elements, the first element including a plurality of prior-calibrated qubit gates and a fidelity interval in which fidelities of the plurality of prior-calibrated qubit gates are located, and the second element including a preferred target qubit gate;
- the second determining unit 2030 being further configured to determine a first calibration means from a plurality of first candidate calibration means based on the first qubit gate and the first fidelity interval and based on a pre-stored second mapping relationship set, the second mapping relationship set including a second mapping relationship between the plurality of the first elements and a plurality of third elements, and the third element including a plurality of calibration means; and a calibration unit 2040, configured to calibrate the second qubit gate based on the first calibration means.

In some embodiments, the second determining unit 2030 is specifically configured to:

obtain a second fidelity corresponding to each first candidate calibration means, the second fidelity being a fidelity obtained by calibrating the second qubit gate based on each first candidate calibration means; and determine the first calibration means from the plurality of first candidate calibration means based on the second fidelity corresponding to each first candidate calibration means.

In some embodiments, the second determining unit 2030 is specifically configured to:

obtain a third fidelity corresponding to the first qubit gate after the second qubit gate is calibrated based on each first candidate calibration means; and determine the first calibration means from the plurality of first candidate calibration means based on the second fidelity corresponding to each first candidate calibration means and the third fidelity.

In some embodiments, the calibration means is to calibrate the fidelity of the qubit gate by adjusting one or more of an amplitude, a frequency, and a phase of a radio frequency signal of the qubit.

The second determining unit 2030 is specifically configured to:

calculate a mean value of amplitudes corresponding to the plurality of first candidate calibration means, to obtain a first amplitude mean value, calculate a mean value of frequencies corresponding to the plurality of first candidate calibration means, to obtain a first frequency mean value, and calculate a mean value of phases corresponding to the plurality of first candidate calibration means, to obtain a first phase mean value;

determine a second candidate calibration means based on the first amplitude mean value, the first frequency mean value, and the first phase mean value; and determine the first calibration means from a calibration means set formed by the plurality of first candidate calibration means and the second candidate calibration means.

In some embodiments, the second determining unit 2030 is further configured to:

generate a first mapping relationship set and a second mapping relationship set in the following manners:

generating a plurality of data groups based on the plurality of qubit gates and a plurality of fidelity intervals, where the data group is generated through any qubit gate in combination with any fidelity interval;

obtaining, for each data group, first fidelity gains corresponding to the qubit gates respectively other than the qubit gate in each data group after calibration, where the first fidelity gains are fidelity gains obtained after calibration of the qubit gates other than the qubit gate in each data group through a selected calibration means;

determining, based on the first fidelity gains, a preferred target qubit gate corresponding to each data group and the plurality of first candidate calibration means used by the preferred target qubit gate;

generating the first mapping relationship set based on a correspondence between each data group and the preferred target qubit gate; and generating the second mapping relationship set based on a correspondence between each data group and the plurality of first candidate calibration means.

In some embodiments, the second determining unit 2030 is further configured to:

obtain a first sum of the fidelities of the plurality of qubit gates before a third qubit gate in each data group is calibrated, where the third qubit gate is any qubit gate of the plurality of qubit gates;

obtain a second sum of the fidelities of the plurality of qubit gates after the third qubit gate in each data group is calibrated through a third candidate calibration means; and determine a first fidelity gain of the third qubit gate in each data group based on the first sum of the fidelities of the plurality of qubit gates and the second sum of the fidelities of the plurality of qubit gates.

In some embodiments, the second determining unit 2030 is further configured to:

when the first fidelity gain after calibration through the third candidate calibration means used by the third qubit gate is greater than a gain threshold, determine the third qubit gate as a preferred target qubit gate corresponding to the data group, and determine the third candidate calibration means as a candidate calibration means corresponding to the data group.

In some embodiments, the first qubit gate is a qubit gate calibrated before the second qubit gate, and no other qubit gates of the plurality of qubit gates are calibrated after the first qubit gate is calibrated.

In some embodiments, the calibration apparatus 2000 for a qubit gate further includes:

a loop calibration unit (not shown), configured to determine the second qubit gate as a current qubit gate, and loop the following operations:

performing fidelity detection on the plurality of qubit gates;

when detecting a qubit gate whose fidelity is less than a pre-determined fidelity value in the plurality of qubit gates, determining a to-be-calibrated qubit gate and a calibration means for calibrating the to-be-calibrated qubit gate based on a fidelity of the current qubit gate, calibrating the to-be-calibrated qubit gate based on the calibration means, and updating the current qubit gate based on the to-be-calibrated qubit gate; and terminating the looping of the operations when the fidelities of the plurality of qubit gates are greater than or equal to the pre-determined fidelity value.

In some embodiments, the first obtaining unit 2020 is configured to:

perform an operation corresponding to the first qubit gate on the qubit, and obtain an actual state of the qubit; and determine the first fidelity of the first qubit gate based on a difference between the actual state and an expected state.

In some embodiments, the first determining unit 2010 is configured to:

obtain an initial fidelity value of each qubit gate of the plurality of qubit gates of the qubit; and determine the qubit gate with the highest initial fidelity value as the first qubit gate.

Figure 19:
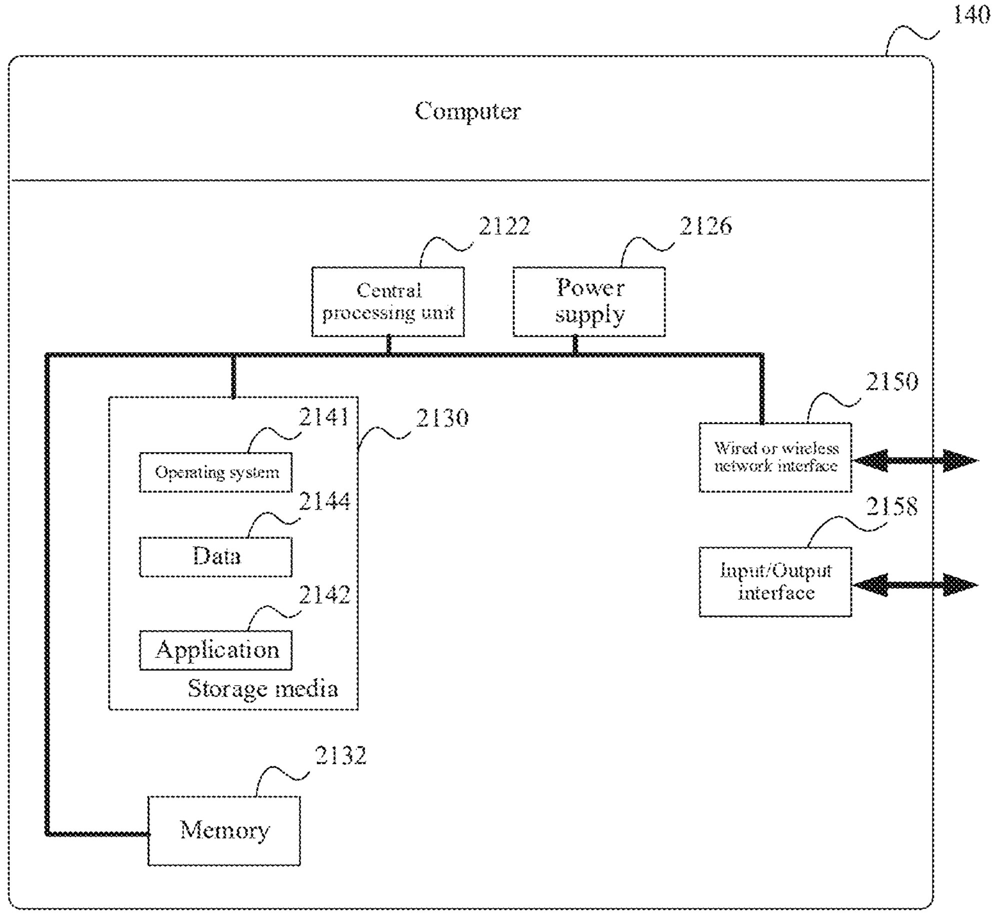
FIG. 19 is a computer structural diagram of a calibration method for a qubit gate according to an embodiment of the present disclosure.

FIG. 19 is a structural block diagram of a part of a computer 140 that implements the calibration method for a qubit gate in an embodiment of the present disclosure. The computer 140 may vary greatly because of different configurations or performance, and may include one or more central processing units (CPUs) 2122 (for example, one or more processors), a memory 2132, and one or more storage media 2130 (for example, one or more mass storage devices) that store an application 2142 or data 2144. The memory 2132 and the storage medium 2130 may be temporarily stored or permanently stored. The program stored in the storage medium 2130 may include one or more modules (not marked in the figure). Each module may include a series of instructions and operations on the computer 140. Further, the central processing unit 2122 may be configured to communicate with the storage medium 2130, and execute a series of instructions and operations in the storage medium 2130 on the computer 140.

The computer 140 may further include one or more power supplies 2126, one or more wired or wireless network interfaces 2150, one or more input/output interfaces 2158, and/or one or more operating systems 2141, such as Windows Server™, Mac OS X™, Unix™, Linux™, and FreeBSD™.

The processor in the computer 140 may be configured to perform the calibration method for a qubit gate in the embodiments of the present disclosure.

The embodiments of the present disclosure further provide a non-transitory computer-readable storage medium, configured to store program code, the program code being configured to perform the calibration method for a qubit gate in the foregoing embodiments.

The embodiments of the present disclosure further provide a computer program product, including a computer program. A processor of a computer device reads and executes the computer program, to cause the computer device to perform the foregoing calibration method for a qubit gate.

The terms "first", "second", "third", "fourth", and the like (if any) in the specification of the present disclosure and the foregoing accompanying drawings are used to distinguish between similar objects, and are not necessarily used to describe a specific order or sequence. The data used in such a way is interchangeable to enable in proper circumstances, so that the embodiments of the present disclosure described herein can be implemented in other sequences than the sequence illustrated or described herein. Moreover, the terms "comprise", "include", and any other variants thereof mean to cover the non-exclusive inclusion. For example, a process, method, system, product, or apparatus that includes a list of operations or units is not necessarily limited to those operations or units that are clearly listed, but may include other operations or units not expressly listed or inherent to such a process, method, system, product, or apparatus.

In the present disclosure, "at least one" means one or more, and "a plurality of" means two or more. The term "and/or" is used to describe an association relationship between associated objects and indicates that three relationships may exist. For example, "A and/or B" may indicate the following three cases: only A exists, only B exists, and both A and B exist, where A and B may be singular or plural. The character "/" generally indicates an "or" relationship between the associated objects. "At least one of the following" or similar expression refers to any combination of these items, including any combination of one item or a plurality of items. For example, at least one of a, b, or c may represent: a, b, c, "a and b", "a and c", "b and c", or "a and b and c", where a, b, and c may be singular or plural.

In the descriptions of the embodiments of the present disclosure, a plurality of means two or more. Greater than, less than, more than, and the like are understood to be not inclusive, and above, below, within, and the like are understood to be inclusive.

In some embodiments provided in the present disclosure, the disclosed system, apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located at one position, or may be distributed on a plurality of network units. Some or all of the units may be selected according to an actual requirement to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a non-transitory computer-readable storage medium. Based on such an understanding, the technical solutions of the present disclosure essentially, or the part contributing to the conventional technology, or all or a part of the technical solutions may be implemented in the form of a software product. The computer software product is stored in a storage medium and includes several instructions for instructing a computer apparatus (which may be a personal computer, a server, or a network apparatus) to perform all or some of the operations of the methods described in the embodiments of the present disclosure. The foregoing storage medium includes: any medium that can store program code, such as a USB flash drive, a removable hard disk drive, a read-only memory (ROM), a random access memory (RAM), a magnetic disk, or an optical disc.

The various implementations provided in the embodiments of the present disclosure may be arbitrarily combined to achieve different technical effects.

The foregoing descriptions are specific descriptions of implementations of the present disclosure, but the present disclosure is not limited to the foregoing implementations. A person skilled in the art may further make various equivalent variations or replacements without departing from the spirit of the present disclosure. These equivalent variations or replacements fall within the scope of the claims of the present disclosure.

What is claimed is:

1. A method for calibrating a plurality of qubit gates in a quantum chip performed by an electronic device, comprising:

selecting, among the plurality of qubit gates for processing a qubit, a first qubit gate that has a highest initial fidelity, wherein the fidelity of a qubit gate is defined as a difference between an actual gate operation result when a predefined operation associated with the qubit gate is performed on the quit in an environment affected by noise interference and a theoretical gate operation result when the predefined operation associated with the qubit gate is performed on the quit in an environment without noise interference;

calibrating the first qubit gate by adjusting one or more of an amplitude, a frequency, and a phase of a first radio frequency signal of a first qubit processed by the first qubit gate;

obtaining a first fidelity of the first qubit gate for processing the qubit;

determining a first fidelity interval including the first fidelity from a plurality of preset fidelity intervals;

determining a target second qubit gate from the plurality of qubit gates based on the first qubit gate and the first fidelity interval and a pre-stored first mapping relationship set, the first mapping relationship set comprising a first mapping relationship between a plurality of first elements and a plurality of second elements, each first element comprising a prior-calibrated qubit gate in the qubit chip and a corresponding fidelity interval in which a fidelity of the prior-calibrated qubit gate are located and a second element corresponding to the first element comprising a target qubit gate in the qubit chip to be calibrated after calibrating the prior-calibrated qubit gate;

determining a first calibration means from a plurality of first candidate calibration means based on the first qubit gate and the first fidelity interval and a pre-stored second mapping relationship set, the second mapping relationship set comprising a second mapping relationship between the plurality of the first elements and a plurality of third elements, each first element comprising the prior-calibrated qubit gate in the qubit chip and the corresponding fidelity interval in which the fidelity of the prior-calibrated qubit gate are located and a third element corresponding to the first element comprising a plurality of calibration means for calibrating the target qubit gate in the qubit chip after calibrating the prior-calibrated qubit gate; and determining the target second qubit gate as the first qubit gate and repeating the said calibrating, obtaining and determining steps until the fidelities of the plurality of qubit gates are all greater than or equal to a pre-determined fidelity value.

2. The method according to claim 1, wherein the determining a first calibration means from a plurality of first candidate calibration means comprises:

obtaining a second fidelity corresponding to the second qubit gate after the second qubit gate is calibrated based on each of the plurality of first candidate calibration means; and determining the first calibration means from the plurality of first candidate calibration means based on a plurality of second fidelities.

3. The method according to claim 1, wherein the determining a first calibration means from a plurality of first candidate calibration means based on the first qubit gate and the first fidelity interval and based on a pre-stored second mapping relationship set comprises:

determining the plurality of first candidate calibration means based on the first qubit gate and the first fidelity interval and based on the pre-stored second mapping relationship set;

calculating a mean value of amplitudes corresponding to the plurality of first candidate calibration means, to obtain a first amplitude mean value, calculating a mean value of frequencies corresponding to the plurality of first candidate calibration means, to obtain a first frequency mean value, and calculating a mean value of phases corresponding to the plurality of first candidate calibration means, to obtain a first phase mean value;

determining a second candidate calibration means based on the first amplitude mean value, the first frequency mean value, and the first phase mean value; and determining the first calibration means from a calibration means set formed by the plurality of first candidate calibration means and the second candidate calibration means.

4. The method according to claim 1, wherein the first mapping relationship set and the second mapping relationship set are generated in the following manners:

generating a plurality of data groups based on the plurality of qubit gates and a plurality of fidelity intervals, wherein the data group is generated through any qubit gate in combination with any fidelity interval;

obtaining, for each data group, first fidelity gains corresponding to the qubit gates respectively other than the qubit gate in each data group after calibration, wherein the first fidelity gains are fidelity gains obtained after calibration of the qubit gates other than the qubit gate in each data group through a selected calibration means;

determining, based on the first fidelity gains, a preferred target qubit gate corresponding to each data group and the plurality of first candidate calibration means used by the preferred target qubit gate;

generating the first mapping relationship set based on a correspondence between each data group and the preferred target qubit gate; and generating the second mapping relationship set based on a correspondence between each data group and the plurality of first candidate calibration means.

5. The method according to claim 1, wherein the first qubit gate is a qubit gate calibrated immediately before the second qubit gate.

6. The method according to claim 1, wherein the method further comprises:

determining the second qubit gate as a current qubit gate, and performing the following operations iteratively:

performing fidelity detection on the plurality of qubit gates;

when detecting a qubit gate whose fidelity is less than a pre-determined fidelity value in the plurality of qubit gates, determining a to-be-calibrated qubit gate and a calibration means for calibrating the to-be-calibrated qubit gate based on a fidelity of the current qubit gate, calibrating the to-be-calibrated qubit gate based on the calibration means, and updating the current qubit gate based on the to-be-calibrated qubit gate; and terminating the looping of the operations when the fidelities of the plurality of qubit gates are all greater than or equal to the pre-determined fidelity value.

7. An electronic device, comprising a memory and a processor, the memory having a computer program stored therein that, when executed by the processor, causes the electronic device to implement a method for calibrating a plurality of qubit gates in a quantum chip including:

selecting, among the plurality of qubit gates for processing a qubit, a first qubit gate that has a highest initial fidelity, wherein the fidelity of a qubit gate is defined as a difference between an actual gate operation result when a predefined operation associated with the qubit gate is performed on the quit in an environment affected by noise interference and a theoretical gate operation result when the predefined operation associated with the qubit gate is performed on the quit in an environment without noise interference:

calibrating the first qubit gate by adjusting one or more of an amplitude, a frequency, and a phase of a first radio frequency signal of a first qubit processed by the first qubit gate;

obtaining a first fidelity of the first qubit gate for processing the qubit;

determining a first fidelity interval including the first fidelity from a plurality of preset fidelity intervals;

determining a target second qubit gate from the plurality of qubit gates based on the first qubit gate and the first fidelity interval and a pre-stored first mapping relationship set, the first mapping relationship set comprising a first mapping relationship between a plurality of first elements and a plurality of second elements, each first element comprising a prior-calibrated qubit gate in the qubit chip and a corresponding fidelity interval in which a fidelity of the prior-calibrated qubit gate are located and a second element corresponding to the first element comprising a target qubit gate in the qubit chip to be calibrated after calibrating the prior-calibrated qubit gate;

determining a first calibration means from a plurality of first candidate calibration means based on the first qubit gate and the first fidelity interval and a pre-stored second mapping relationship set, the second mapping relationship set comprising a second mapping relationship between the plurality of the first elements and a plurality of third elements, each first element comprising the prior-calibrated qubit gate in the qubit chip and the corresponding fidelity interval in which the fidelity of the prior-calibrated qubit gate are located and a third element corresponding to the first element comprising a plurality of calibration means for calibrating the target qubit gate in the qubit chip after calibrating the prior-calibrated qubit gate; and determining the target second qubit gate as the first qubit gate and repeating the said calibrating, obtaining and determining steps until the fidelities of the plurality of qubit gates are all greater than or equal to a pre-determined fidelity value.

8. The electronic device according to claim 7, wherein the determining a first calibration means from a plurality of first candidate calibration means comprises:

obtaining a second fidelity corresponding to the second qubit gate after the second qubit gate is calibrated based on each of the plurality of first candidate calibration means; and determining the first calibration means from the plurality of first candidate calibration means based on a plurality of second fidelities.

9. The electronic device according to claim 7, wherein the determining a first calibration means from a plurality of first candidate calibration means based on the first qubit gate and the first fidelity interval and based on a pre-stored second mapping relationship set comprises:

determining the plurality of first candidate calibration means based on the first qubit gate and the first fidelity interval and based on the pre-stored second mapping relationship set;

calculating a mean value of amplitudes corresponding to the plurality of first candidate calibration means, to obtain a first amplitude mean value, calculating a mean value of frequencies corresponding to the plurality of first candidate calibration means, to obtain a first frequency mean value, and calculating a mean value of phases corresponding to the plurality of first candidate calibration means, to obtain a first phase mean value;

determining a second candidate calibration means based on the first amplitude mean value, the first frequency mean value, and the first phase mean value; and determining the first calibration means from a calibration means set formed by the plurality of first candidate calibration means and the second candidate calibration means.

10. The electronic device according to claim 7, wherein the first mapping relationship set and the second mapping relationship set are generated in the following manners:

generating a plurality of data groups based on the plurality of qubit gates and a plurality of fidelity intervals, wherein the data group is generated through any qubit gate in combination with any fidelity interval;

obtaining, for each data group, first fidelity gains corresponding to the qubit gates respectively other than the qubit gate in each data group after calibration, wherein the first fidelity gains are fidelity gains obtained after calibration of the qubit gates other than the qubit gate in each data group through a selected calibration means;

determining, based on the first fidelity gains, a preferred target qubit gate corresponding to each data group and the plurality of first candidate calibration means used by the preferred target qubit gate;

generating the first mapping relationship set based on a correspondence between each data group and the preferred target qubit gate; and generating the second mapping relationship set based on a correspondence between each data group and the plurality of first candidate calibration means.

11. The electronic device according to claim 7, wherein the first qubit gate is a qubit gate calibrated immediately before the second qubit gate.

12. The electronic device according to claim 7, wherein the method further comprises:

determining the second qubit gate as a current qubit gate, and performing the following operations iteratively:

performing fidelity detection on the plurality of qubit gates;

when detecting a qubit gate whose fidelity is less than a pre-determined fidelity value in the plurality of qubit gates, determining a to-be-calibrated qubit gate and a calibration means for calibrating the to-be-calibrated qubit gate based on a fidelity of the current qubit gate, calibrating the to-be-calibrated qubit gate based on the calibration means, and updating the current qubit gate based on the to-be-calibrated qubit gate; and terminating the looping of the operations when the fidelities of the plurality of qubit gates are all greater than or equal to the pre-determined fidelity value.

13. A non-transitory computer-readable storage medium, having a computer program stored therein, the computer program, when executed by a processor of an electronic device, causing the electronic device to implement a method for calibrating a plurality of qubit gates in a quantum chip including:

selecting, among the plurality of qubit gates for processing a qubit, a first qubit gate that has a highest initial fidelity, wherein the fidelity of a qubit gate is defined as a difference between an actual gate operation result when a predefined operation associated with the qubit gate is performed on the quit in an environment affected by noise interference and a theoretical gate operation result when the predefined operation associated with the qubit gate is performed on the quit in an environment without noise interference;

calibrating the first qubit gate by adjusting one or more of an amplitude, a frequency, and a phase of a first radio frequency signal of a first qubit processed by the first qubit gate;

obtaining a first fidelity of the first qubit gate for processing the qubit;

determining a first fidelity interval including the first fidelity from a plurality of preset fidelity intervals;

determining a target second qubit gate from the plurality of qubit gates based on the first qubit gate and the first fidelity interval and a pre-stored first mapping relationship set, the first mapping relationship set comprising a first mapping relationship between a plurality of first elements and a plurality of second elements, each first element comprising a prior-calibrated qubit gate in the qubit chip and a corresponding fidelity interval in which a fidelity of the prior-calibrated qubit gate are located and a second element corresponding to the first element comprising a target qubit gate in the qubit chip to be calibrated after calibrating the prior-calibrated qubit gate;

determining a first calibration means from a plurality of first candidate calibration means based on the first qubit gate and the first fidelity interval and a pre-stored second mapping relationship set, the second mapping relationship set comprising a second mapping relationship between the plurality of the first elements and a plurality of third elements, each first element comprising the prior-calibrated qubit gate in the qubit chip and the corresponding fidelity interval in which the fidelity of the prior-calibrated qubit gate are located and a third element corresponding to the first element comprising a plurality of calibration means for calibrating the target qubit gate in the qubit chip after calibrating the prior-calibrated qubit gate; and determining the target second qubit gate as the first qubit gate and repeating the said calibrating, obtaining and determining steps until the fidelities of the plurality of qubit gates are all greater than or equal to a predetermined fidelity value.

14. The non-transitory computer-readable storage medium according to claim 13, wherein the first qubit gate is a qubit gate calibrated immediately before the second qubit gate.

* * * * *